United States Patent [19]

Henrickson et al.

[11] 3,885,102

[45] May 20, 1975

[54] MESSAGE METERING SYSTEM HAVING MULTI-LEVEL SIGNALS AND PARTY DISCRIMINATION

[75] Inventors: Gary C. Henrickson, Palo Alto; John C. McDonald, Los Altos, both of Calif.

[73] Assignee: Vidar Corporation, Calif.

[22] Filed: Sept. 10, 1973

[21] Appl. No.: 396,092

[52] U.S. Cl. .................................. 179/7 R; 179/8.5

[51] Int. Cl. .......................................... H04n 15/10

[58] Field of Search ..... 179/7 R, 7 MM, 7.1 R, 8 R, 179/8.5

[56] References Cited

UNITED STATES PATENTS

| | | | |
|---|---|---|---|
| 2,901,544 | 8/1959 | Collins | 179/8.5 |
| 3,025,354 | 3/1962 | Ost et al. | 179/8.5 |
| 3,071,650 | 1/1963 | Cahill et al. | 179/8.5 |
| 3,267,216 | 8/1966 | Raab et al. | 179/7.1 TP |
| 3,271,522 | 9/1966 | polensky | 179/7.1 TP |
| 3,560,658 | 2/1971 | Molloy et al. | 179/7.1 TP |

*Primary Examiner*—William C. Cooper
*Assistant Examiner*—Gerald L. Brigance
*Attorney, Agent, or Firm*—Flehr, Hohbach, Test, Albritton & Herbert; David E. Lovejoy

[57] ABSTRACT

Disclosed is a local message metering system for metering information concerning each subscriber's use of a telephone system. Each subscriber is associated with a multi-state signal which is directly connected to the metering system to indicate subscriber usage of the telephone system. A multi-state signal for each calling subscriber is impressed on the sleeve lead within the office trunk circuits and is therefore connected through the switching exchange to the main distribution frame where all subscribers are connected. Each sleeve for a connected calling subscriber carries a unique multi-state signal associated with that subscriber. The multi-state signal for each subscriber is digitally encoded, scanned and interpreted and recorded by the metering system. The discrimination between parties on a multi-party subscriber line is performed by signals on the sleeve of different state for each party.

20 Claims, 11 Drawing Figures

MESSAGE METERING SYSTEM HAVING MULTI-LEVEL SIGNALS AND PARTY DISCRIMINATION

CROSS REFERENCE TO RELATED APPLICATIONS

1. MESSAGE METERING SYSTEM, invented by JOHN C. McDONALD and DALTON W. MARTIN, Ser. No. 295,656 filed Oct. 6, 1972, now U.S. Pat. 3,818,456, assigned to Vidar Corporation.

2. MESSAGE METERING AND STORAGE SYSTEM, invented by JOHN C. McDONALD and JAMES R. BAICHTAL, Ser. No. 321,275 filed Jan. 5, 1973, now U.S. Pat. No. 3,825,689, assigned to Vidar Corporation.

3. SAMPLING AND ANALOG-TO-DIGITAL CONVERTER APPARATUS FOR USE IN A TELEPHONE MESSAGE METERING SYSTEM, invented by GARY C. HENRICKSON and JOHN C. McDONALD, Ser. No. 321,376 filed Jan. 5, 1973, assigned to Vidar Corporation.

4. REDUNDANT DATA TRANSMISSION SYSTEM, invented by JOHN C. McDONALD and JAMES R. BAICHTAL, Ser. No. 365,045 filed May 29, 1973, assigned to Vidar Corporation.

5. TAPE SPEED MONITOR, invented by JAMES R. BAICHTAL, Ser. No. 365,029 filed May 29, 1973, now U.S. Pat. No. 3,829,893 assigned to Vidar Corporation.

BACKGROUND OF THE INVENTION

The present invention relates to the field of telephone systems and particularly to message metering systems for detecting and storing information concerning subscriber usage of the system.

Message metering equipment is necessary for recording information resulting from toll, long distance and other types of telephone service. Such equipment requires the ability to detect and store information to enable usage-sensitive charging of subscribers. Local use by subscribers has been on a nonusage-sensitive basis employing equipment which has not heretofore, been readily adapted to metering. With new types of local telephone usage such as credit-card checking, time-sharing data transmission, and burglary prevention, a need for detecting and storing information concerning the nature of local usage has become important.

While apparatus exists for monitoring the gross accumulated number of events, such as the number of completed calls for a telephone subscriber, such apparatus does not provide sufficient data for detailed billing of subscribers on a usage-sensitive basis. Also, party identification has been employed by phase encoding signals on a sleeve lead; but again, such apparatus does not provide sufficient data for detailed billing of local subscribers on a usage-sensitive basis.

While modern day electronic technology provides increased capability for reliably processing information signals, the application of that technology to the presently installed local subscriber telephone circuitry for usage-sensitive metering has presented a problem in reliability and economy which has not heretofore been adequately solved.

While the general technique of forming multi-state signals, for each subscriber is generally described in the above-referenced invention entitled MESSAGE METERING SYSTEM, that system in detail relies upon the generation of multi-level signals on existing metering lines. In the well-known number 5 crossbar switch and in other switches, however, no metering lines per se exist and accordingly, problems result in applying multi-level measuring techniques to those switches. Accordingly, a need exists for methods and apparatus for metering local subscriber usage of telephone circuitry which does not presently have metering lines adaptable for metering on a usage-sensitive basis.

SUMMARY OF THE INVENTION

The present invention is a method and apparatus for metering subscriber usage in a telephone system. Specifically the present invention includes multi-state signal generators for generating signals on the trunk circuits of a telephone switching exchange. The states of the multi-state signals represent usage information.

Within the trunk circuits, each sleeve is connected to its own multi-state signal generator. Each telephone subscriber is associated with a seleve and each calling party is associated with a multi-state signal on the sleeve as connected through the exchange. Each subscriber in the system has its associated sleeve connected as an input line to a scanner bank of a message metering system. Each scanner bank periodically polls the connected sleeve lines for sensing the level of the multi-state signal. The multi-state signal level is encoded through an analog-to-digital converter where it is transmitted to a scanner bank adapter which functions to detect, analyze and store the sequence of signals representing subscriber usage of the telephone system.

In a preferred embodiment of the present invention, the trunk circuits within the switching exchange are connected one for one with trunk adapter circuits where each trunk adapter circuit functions as a multi-level signal generator. The trunk adapter circuit is responsive to party signals, tip or ring in a two-party system, to answer supervision signals and to zone signals for generating the appropriate multi-state signal.

In one embodiment of the present invention, the trunk circuit adapter or signal generator is comprised of a party store, an answer supervision circuit, a zone circuit, control logic, an analog-to-digital converter and a busy detector. The control logic is responsive to a party store signal, an answer supervision signal and a zone signal for generating digital outputs representative of the desired sleeve multi-level voltage. The digital-to-analog converter is responsive to the digital signals from the control means to provide the desired multi-level sleeve signal. The converter supplies pulsed energy by means of a free-running generator into a resonant circuit. The output signal from the resonant circuit is fed back and sensed to control a skip-pulse generator. Whenever the output is too high the skip pulse circuitry inhibits input pulses. The converter operates both in a high power mode when sleeve line current exists and in a low power mode when the sleeve is connected as an open circuit. Because the multi-level output signal is controlled in both high and low power modes, the output signal logically indicates the state of the sleeve current. This state is detected in the busy detector of the present invention.

The logic circuitry of the trunk circuit adapter is responsive to the party store for appropriately selecting the sleeve lead voltage at levels which indicate which one of the party subscribers is a calling party.

In accordance with the above summary, the present invention achieves the objective of providing methods and apparatus for metering local subscriber usage of a telephone system by generating multi-level signals in a switching exchange for each calling subscriber.

Additional objects and features of the invention will appear from the following description in which the preferred embodiments of the invention have been set forth in detail in conjunction with the drawings.

DETAILED DESCRIPTION

Figure 1:
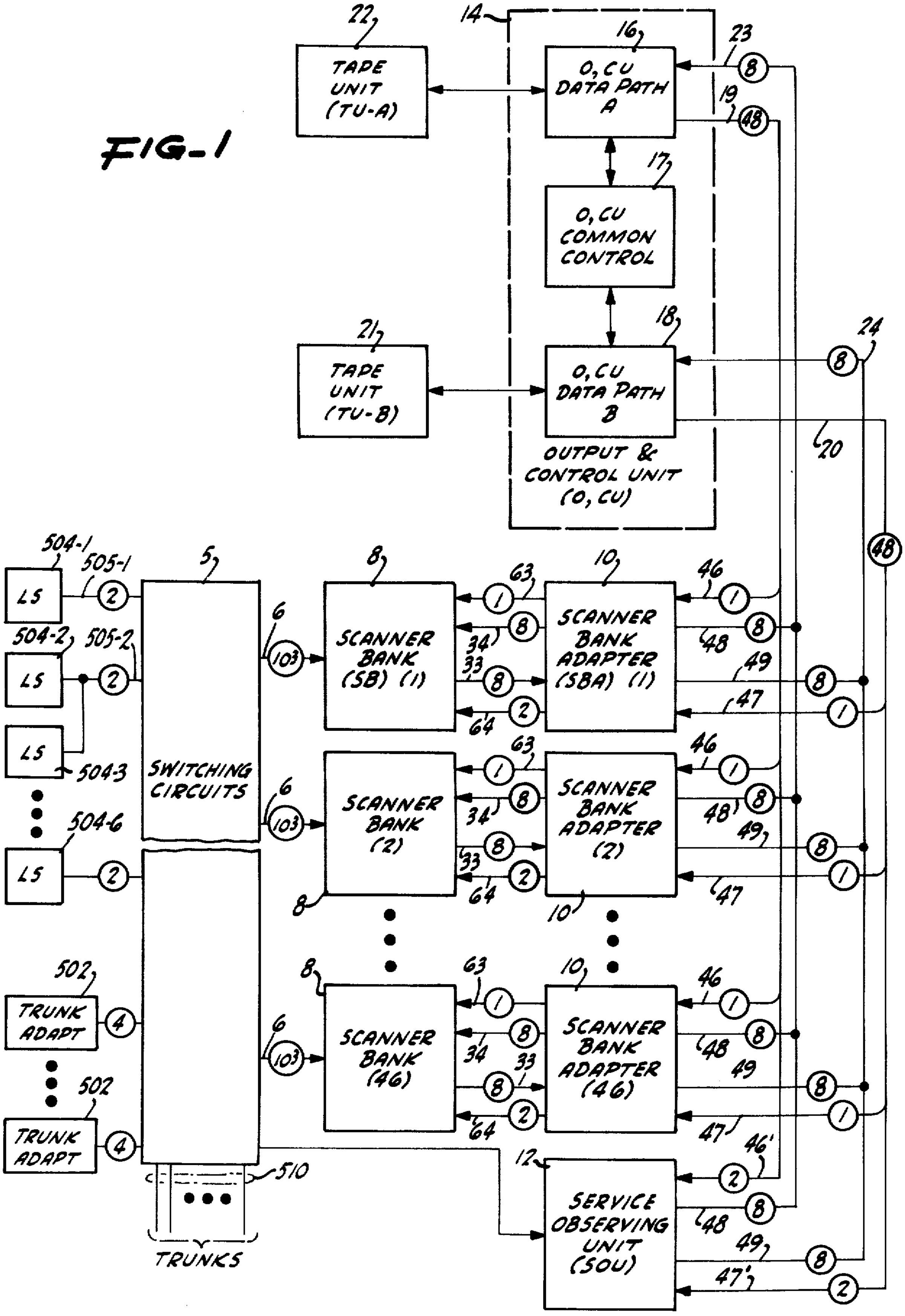
FIG. 1 depicts a schematic representation of an overall message metering system and its connection to telephone switching circuits.

Overall System - FIG. 1

Referring to FIG. 1, a message metering system is depicted in which each local subscriber 504 is interconnected by two subscriber lines 505 to switching circuits 5. The subscriber metering lines 6 are output from switching circuits 5 and connected as inputs to the scanner banks 8. Switching circuits 5 are typically of the number 5 crossbar type wellknown in the field of telephony.

In accordance with one embodiment of the present invention the switching circuits are organized with metering outputs in groups of up to one thousand ($10^3$). Those outputs correspond to the contiguous local subscribers defined by the three low-order digits of telephone directory numbers having common higher-order digits. Each scanner bank 8 receives as inputs up to one thousand subscriber metering lines, one line associated with each subscriber for one-party lines or two subscribers for two-party lines. The metering lines 6 are connected to the sleeve lead connections within the number 5 crossbar switch. Each scanner bank 8 periodically gates out signals representing the information on the lines 6 to bus 33 in groups of four two-bit signals, one two-bit signal per subscriber, at a time.

An 8-bit binary input address bus 34 periodically addresses the lines 6 and selects the output for bus 33. Each address bus 34 and each data bus 33 in FIG. 1 is connected between a scanner bank 8 and an associated scanner bank adapter 10. Additionally, a line 63 and two lines 64 connect, for error checking and control purposes, from each scanner bank adapter 10 to the associated scanner bank 8.

Still referring to FIG. 1, each scanner bank adapter 10 receives one set from a total of 256 sets, of four 2-bit signals (8 lines) on buses 33 where the particular set of four is specified by the 8-bit binary address on bus 34. The address on bus 34 is derived from scanner bank adapter 10.

The input data bus 33 to each scanner bank adapter 10 carries information in digital form about usage of the system by local subscribers 504. That information is analyzed by the adapter 10 and stored to enable a data read-out from the adapter at appropriate times to record the usage of the system by each subscriber. The information is read out on an output data bus 48 associated with the data path A or on an output data bus 49 associated with the data path B. The selection of whether the data path A bus 48 or the data path B bus 49 is the active one is under the control of the select lines 46 and 47, respectively. The select lines 46 and 47 are each one of the 48 select lines in the select bus 19 or the select bus 20, respectively. The select lines 46 and 47 are energized by the output and control unit (OCU) 14. The 8-bit data buses 48 and 49 from each of the scanner bank adapters 10 are all connected in common to the 8-bit data buses 23 and 24, respectively, which are input to the data path A circuitry 16 and the data path B circuitry 18, respectively, of the output and control unit 14. In addition to selecting one of the 46 scanner bank adapters 10 through appropriate selection of one of the select lines 19 or one of the select lines 20, the service observing unit 12 has two addresses which are selectable by two select lines 46′ and 47′ of the select lines 19 and 20, respectively, which are associated with data path A and data path B, respectively.

Still referring to FIG. 1, the output and control unit 14 has the data path A circuitry 16 connected to a tape unit 22 and the data path B circuitry 18 connected to a tape unit 21. Whenever the data path A or the data path B receives a signal from adapter 10 indicating that a subscriber line 6 has been active and the subscriber has terminated his call, the output and control unit recognizes the termination and causes the desired information about the subscriber's use of the system to be transferred out to the respective tape unit 21 or 22 depending upon whether data path A or data path B is operational.

Portions of the system of FIG. 1 are described in more detail in the above-referenced application MESSAGE METERING SYSTEM which is hereby incorporated by reference in this specification.

While the connection of the scanner bank adapter 10 to unit 14 is shown in FIG. 1 to be direct, another embodiment of the present invention has the adapters connected through a remote data link (not shown).

Figure 2:
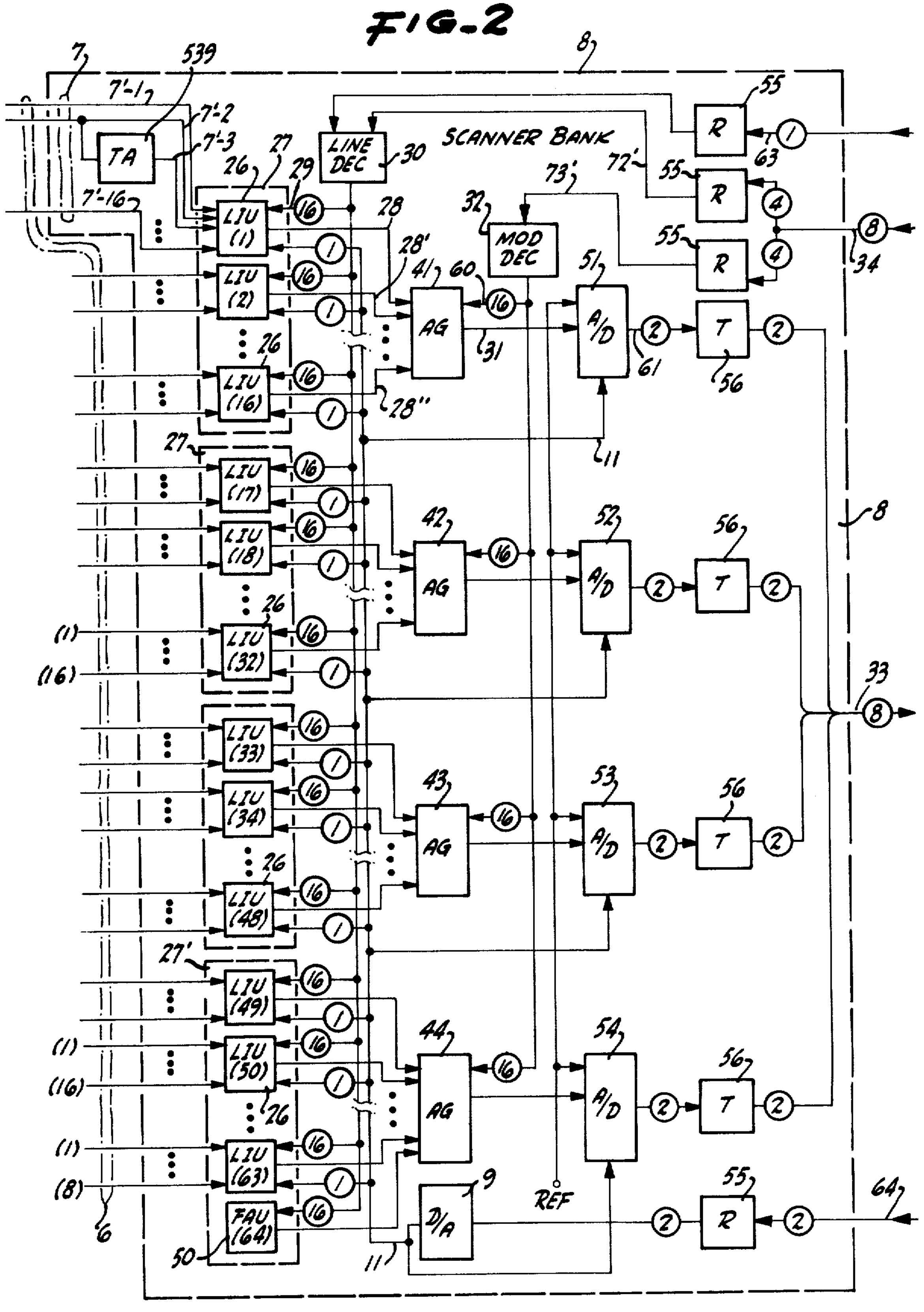
FIG. 2 depicts a schematic representation of one scanner bank which is typical of the plurality of scanner banks in the apparatus of FIG. 1.

Scanner Bank - FIG. 2

Referring to FIG. 2, a typical one of the scanner banks 8 of FIG. 1 is shown in detail. The metering lines 6, derived from the switching circuit 5 of FIG. 1, are input to a plurality of line interface units (LIU) 26, with 16 inputs per unit. The input lines 7 to the LIU (1) are typical.

In FIG. 2, the lines 7'-1, 7'-2 and 7'-16 are each input from the switching circuits 5. Referring momentarily to FIG. 1, the line 7'-1 is associated with the one-party local subscriber 504-1 and the sleeve associated with the tip and ring lines 505-1. Similarly, input line 7'-2 is connected to the sleeve associated with the tip and ring lines 505-2. Lines 505-2 are associated, however, with the local subscribers 504-2 and 504-3 in a two-party connection. Line 7'-2 connects directly as an input to LIU (1) and it is associated with the ring party 504-2. Input 7-3 is derived from a tip party attenuator 539 which derives its input from metering line 7'-2. For each two-party connection, an attenuator like attenuator 539 is employed to form the second input to the LIU 26. The number of input lines from circuits 5 may be a total of 16 if 16 local subscribers have one-party connections. For each two-party connection, however, the number of lines from circuits 5 is reduced by 1 and an attenuator like attenuator 539 is included to derive the second line. By way of example, for eight, two-party connections, a total of eight lines are derived from the switching circuits 5 and eight additional lines are formed as outputs from attenuators 539 so that a total of 16 inputs are connected to the LIU 26.

Each LIU 26 functions under control of input address lines 29, to select one of the 16 input lines 7'-1, 7'-2, . . . , 7'-16 and connect it to output line 28 as shown, for example, in connection with LIU (1). The particular one of the 16 input lines is gated to the one output line by appropriate selection of one of the 16 select lines 29. The 16 select lines are derived from a line decoder 30 which receives and decodes a 4-bit binary input on lines 72' via receiver 55 and bus 34 to select one of its 16 outputs. Each of the 16 output select lines from the line decoder 30 is connected as an input to all the LIU units 1 through 63 and the fixed address-unit (FAU) 50. Groups of 16 LIU's 26 form a module 27 with 16 output lines connected as inputs to analog gates. Specifically, LIU 1, LIU 2, . . . , LIU 16 have their output lines 28, 28', . . . , 28'' connected as the 16 inputs to the analog gates 41. Similarly, the LIU 17 through LIU 32 have their respective outputs connected as the 16 inputs to the analog gates 42. Finally the LIU 49 through LIU 63 and FAU (64) have their outputs connected as the 16 inputs to the analog gates 44. The analog gates 41 through 44 are each operative to select one of their respective 16 inputs to form a single output to an analog-to-digital (A/D) converter. Specifically, analog gates 41, 42, 43 and 44 each have an output 31 which is connected as an input to the analog-to-digital converters 51, 52, 53 and 54, respectively. The selection of which one of the 16 inputs to analog gates 41 is connected as the output on line 31 is controlled by one of the 16 select lines 60 input in common to each of the gates 41 through 44. The select lines 60 are derived from the module decoder 32 which receives a 4-bit binary input on lines 73' via receiver 55 and bus 34 and decodes it to energize one of its 16 outputs.

The operation of the decoders 30 and 32, in connection with the LIU's 1 through 16 and the analog gates 41 is to select one of 256 subscriber line input signals at any one time and connect that subscriber signal as an input to the analog-to-digital converter 51. The converter 51 senses the multivalue input on line 31 and encodes it into a 2-bit binary code on output lines 61. The signal on line 31 is typically at one of four levels (−48, −3, +8, +18 volts) defined after encoding by the two binary bits on lines 61. Lines 61 are connected as an input to the transmitters 56. Transmitters 56, one for each of the two lines 61, serve as a high impedance isolation, when connected through a corresponding receiver, between the scanner bank of FIG. 2 and the scanner bank adapter of FIG. 3. Simultaneously, the decoders 30 and 32 also select one of 256 of the subscriber signals from LIU's 17 through 32 for encoding to a 2-bit signal output from converter 52, one of 256 of the subscriber signals from LIU's 33 through 48 which produces the encoded output from converter 53, and one of the 232 subscriber signals from the LIU's 49 through 63 or one of the 16 fixed values from FAU 64 to produce the encoded output from converter 54. The 2-bit outputs from each of the converters 51 through 54 are each, through transmitters 56, formed as the eight output lines of bus 33.

The LIU 63 includes only 8 used inputs so that together with the 992 inputs of the LIU 1 through LIU 62 there are a total of 1000 subscriber inputs of the 7' type.

The fixed address unit (FAU) 50 receives the 16 address bits on address bus 29 from the line decoder 30. The unit 50 has its 16 address locations wired to selected marginal values which test the "REF" input to each of the analog-to-digital converter 51 through 54. Additionally, the unit 50 when addressed, tests the threshold values within the converter 54 via gates 44, the fixed addresses can be distributed through the LIU 1 through 63 so that fixed addresses are connected to each of the converters 51 through 54 thereby testing each of those converters.

All of the LIU and converters have an analog input from line 11 derived from input 64 which is output from the scanner bank adapter 10 in FIG. 1. The input bits on line 64 function to define three values (high, normal and low) to test all of the units 1 through 63. Those three analog values are produced in the digital-to-analog (D/A) converter 9 on output line 11. Additionally, the line decoder 30 has an input via line 63 from the scanner bank adapter 10. That input line 63 functions to de-energize all units 1 through 64 so that none are selected.

Figures 10, 11:
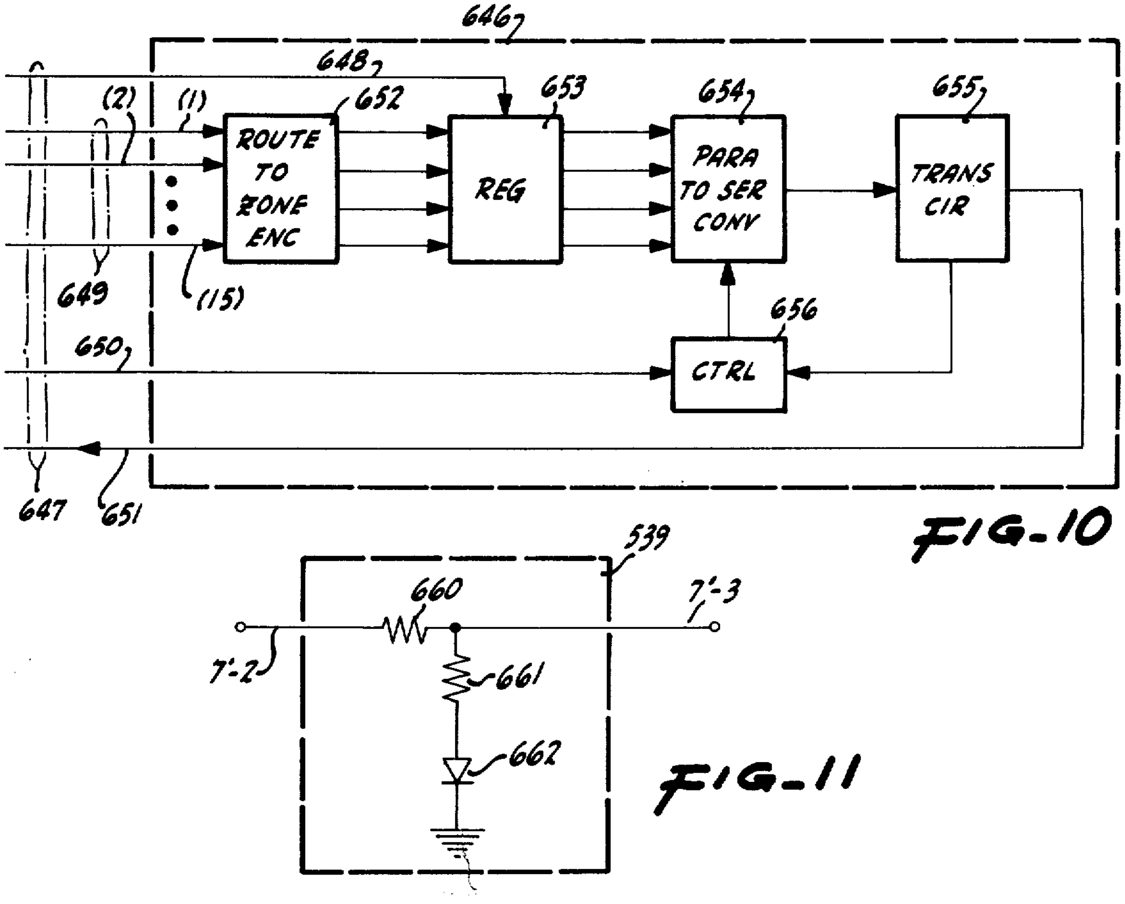
FIG. 10 depicts a schematic representation of the zone pulse generator in the FIG. 3 apparatus.
FIG. 11 depicts a schematic representation of the tip party attenuator circuit in the apparatus of FIG. 2.

The attenuator circuit 539 in FIG. 2 is typical of the circuits employed with multi-party connections. Details of the circuit 539 are shown in FIG. 11. The input line 7'-2 connects to a resistor 660 which in turn connects to the output line 7'-3. The output line 7'-3 also connects through a resistor 661 and a diode 662 to ground.

Figures 3, 4:
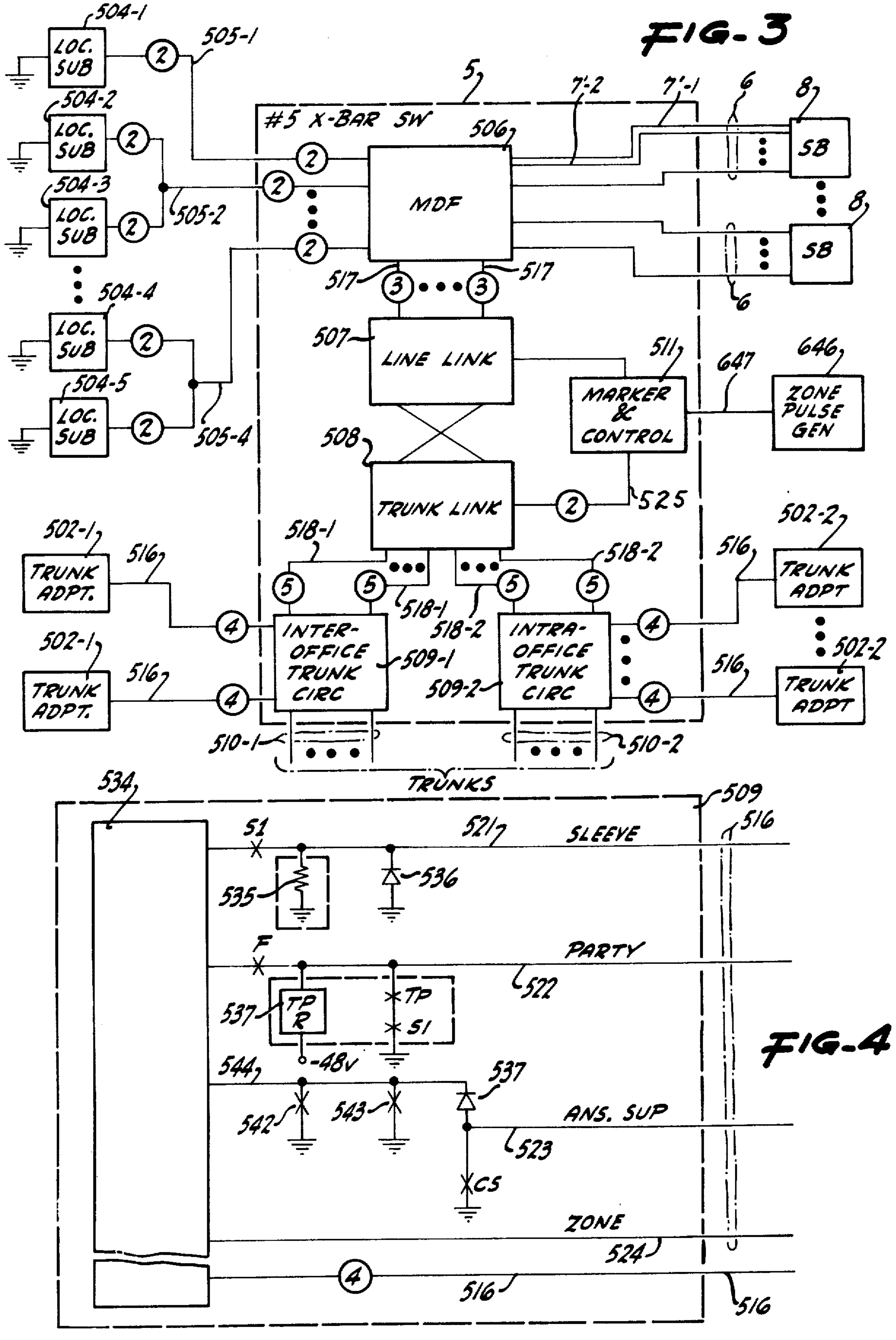
FIG. 3 depicts a schematic representation of the switching circuits of FIG. 1 and their interconnection to local subscribers, scanner banks and trunk adapter circuits.
FIG. 4 depicts a portion of a typical number 5 crossbar switch trunk circuit showing connections and modifications required in connection with one embodiment of the present invention.

Number 5 Crossbar Switch - FIG. 3

In FIG. 3, a schematic representation of a number 5 crossbar switch is shown. The number 5 crossbar switch is in use in many locations through out the world. In FIG. 3, switch 5 typically includes a main distribution frame 506 to which each local subscriber 504 is connected. The local subscribers 504-1 through 504-5 in FIG. 3 are representative of a large group of local subscribers which may be as many as 35,000 or more. In the number 5 crossbar switch, local subscribers are typically connected with one-party or two-party lines. For local subscriber 504-1, a one-party connection is shown in which two lines 505-1 connect local subscriber 504-1 to the frame 506. The two lines 505-1 are the well-known tip and ring lines. For local subscribers 504-2 and 504-3, a two-party connection is shown in which each of the local subscribers is connected in common to the tip and ring lines 505-2 which in turn connect to the frame 506. Local subscribers 504-4 and 504-5 are again an example of a two-party connection connected to frame 506 by lines 505-4.

Within the number 5 crossbar switch, the frame 506 has a unique connection for each of the tip and ring lines 505. Each of those tip and ring lines have connection points on frame 506 which are also connected, on a one-for-one line basis, to two of the three lines 517. The other line in the lines 517 is a sleeve lead or sleeve line. There is a unique sleeve line in lines 517 for each set of local subscriber lines 505. For each set of input lines 505 to the frame 506 there is a corresponding set of three lines 517 between the frame 506 and the line link 507. For example, if there are 10,000 sets of lines 505, there are 10,000 associated sets of lines 517.

The line link 507 and the trunk link 508 operate to connect selected ones of the lines 517 to selected ones of the trunk lines 518. The trunk lines 518 include a set of lines 518-1 which connect to the inter-office trunk circuits 509-1 and a set of trunk lines 518-2 which connect to the intra-office trunk circuits 509-2. In a typical system with 10,000 lines 505, there are typically 500 lines 518-1 and 500 lines 518-2. Accordingly, 500 of the lines 517 and associated local subscribers 504 can be connected to the lines 518-1 and a separate 500 of the lines 517 and associated local subscribers can be connected to the lines 518-2 at any given point in time. The sets of lines 518-1 and 518-2 each include five lines. Three of the four lines correspond to the three lines 517, that is, tip, ring and sleeve lines. The fourth and fifth lines in each of the lines 518 corresponds to a party and zone line which are derived from the marker and control circuitry 511.

The trunk circuits 509-1 and 509-2 receive the input lines 518-1 and 518-2, respectively, and connect the associated tip and ring to the outgoing trunks 510-1 and 510-2, respectively. There is one trunk line 510-1 for each of the sets of lines 518-1 and similarly, one trunk line 510-2 for each of the sets of lines 518-2.

Still referring to FIG. 3, the trunk circuits 509-1 and 509-2 are each connected to trunk adapters 502-1 and 502-2, respectively. Each trunk adapter 502 is connected to a trunk circuit 509 by the sets of lines 516. For each of the set of lines 518-1 there are corresponding sets of lines 516. The four lines 516 correspond to the sleeve, party, answer supervision and zone lines within the trunk circuits 509. Of those lines 516, the sleeve and zone lines are two of the lines in the five-line set 518. The other two lines, party and answer supervision lines, are described in further detail in connection with FIG. 4.

Office Trunk Circuits - FIG. 4

In FIG. 4, only a portion of a typical trunk office circuit 509 is shown. The sleeve line 521 is one of the sleeve lines which connects to the frame 506 through the line link 507 and the trunk link 508 by way of the lines 518. Similarly, the zone line 524 is one of the lines 525 which connects from the marker and control 511 designated as line 525 through one of the lines 518 to the lines 516. In a conventional number 5 crossbar switch, the sleeve line 521 connects through a relay contact S-1 through a resistor 535 to ground. In order to allow positive signals to be impressed on the sleeve line 521, the resistor 535 is removed and in its place a diode 536 is connected.

The party line 522 conventionally connects through a switch contact F to a tip-party relay (TP) 537 which is in turn connected to −48 volts. Also the party line 522 is conventionally connected through the switch contacts TP and S1 to ground. The function of the relay 537 is normally to store whether the tip or ring party, in a two-party connection, is the calling party. Normally the party line 522 is ground if the tip party is a calling party or −48 if the ring party is a calling party.

In one embodiment of the present invention, the relay 537 and the contacts TP and S1 to ground are removed. The storage of whether the tip or ring party is the calling party is no longer done, therefore, in relay 537 but is done in the present invention in the party store 512 discussed hereinafter.

Still referring to FIG. 4, the answer supervision circuitry associated with the answer supervision line 523 connects through a contact CS to ground. Normally, the line 523 also connects directly to line 544, through a contact 543 and through a contact 542 to ground. In accordance with one embodiment of the present invention, a diode 537 is inserted between line 523 and line 544. In this manner, a voltage across the CS contact can be detected on line 523 to give a logical indication of a called party answer. When a −48 volt appears on line 523 a called party disconnect is indicated. In other circuits, a closed condition of contact CS is employed to indicate a called party answer in which case the line 523 will be at ground.

Figure 5:
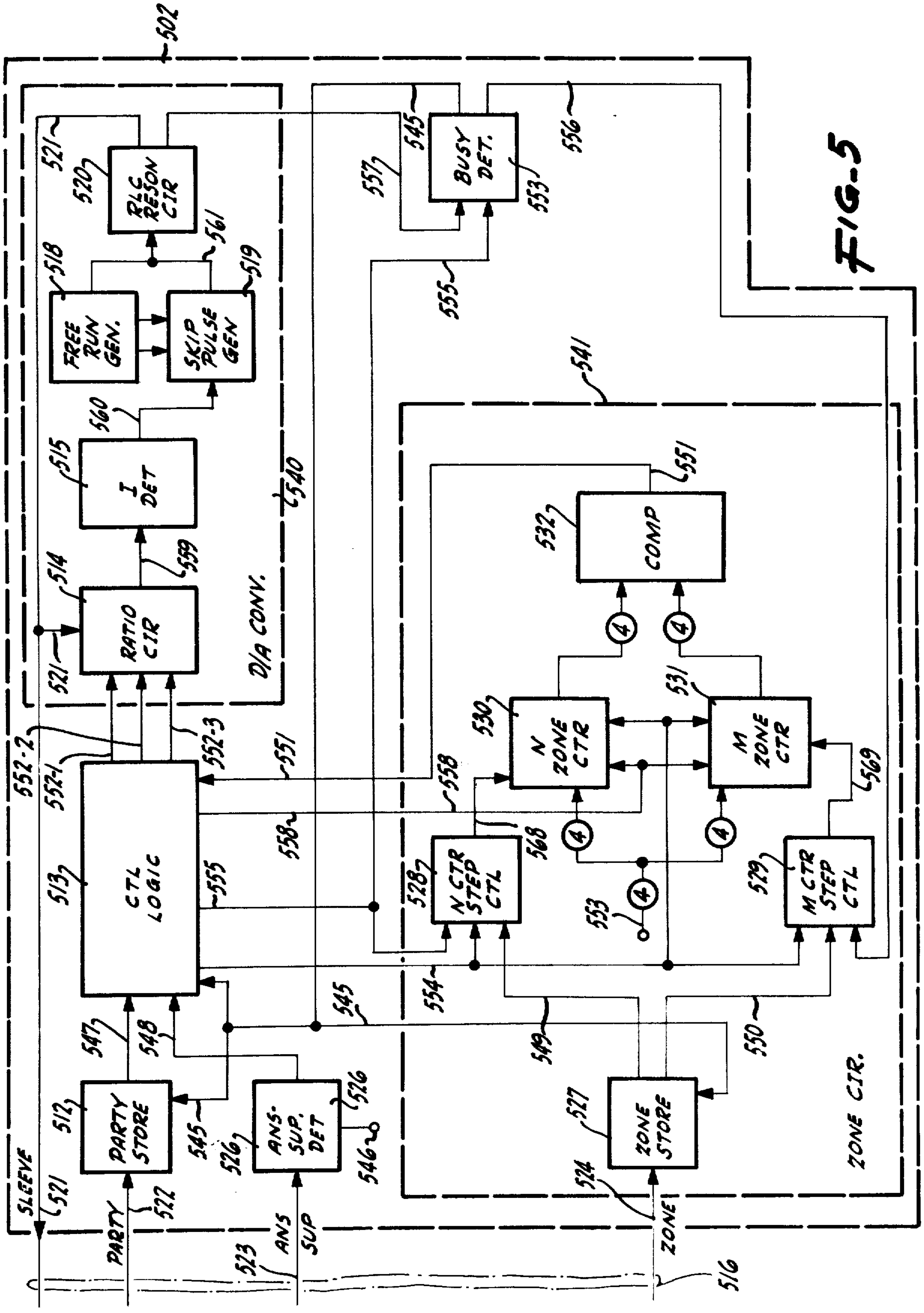
FIG. 5 depicts a block diagram representation of the trunk adapter circuits of FIG. 1 and FIG. 3.

Trunk Adapters-FIG. 5

In FIG. 5, the trunk adapters 502 of FIG. 3 are shown in further detail. The input lines 516 include the sleeve line 521, the party line 522, the answer supervision line 523 and the zone line 524. The FIG. 5 circuitry operates to generate multi-level signals on the sleeve line 521 in response to the inputs on lines 522, 523 and 524.

Figure 6:
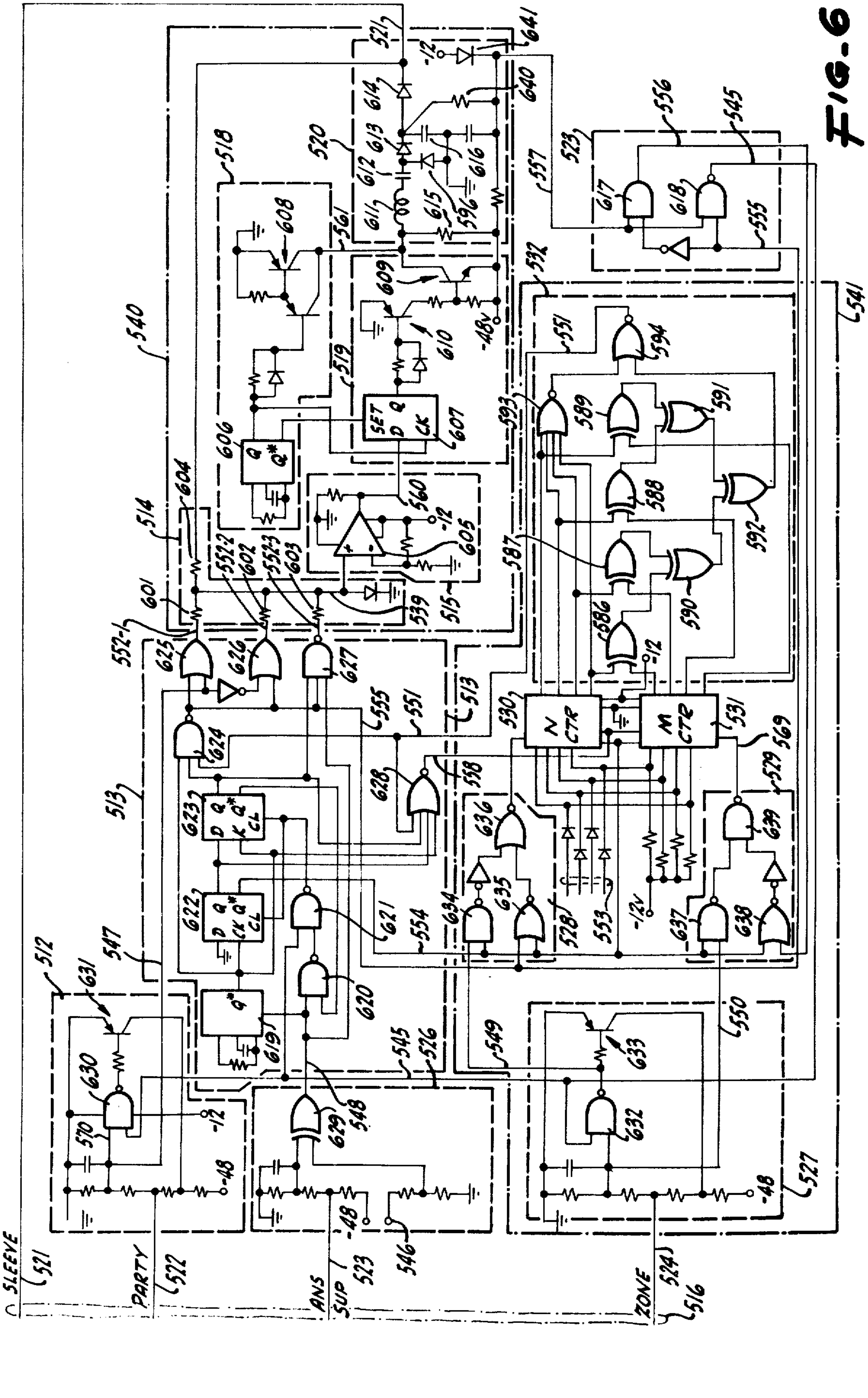
FIG. 6 depicts a detailed schematic representation of the trunk adapter circuit of FIG. 5.

In FIG. 5, and in further detail in FIG. 6, the trunk adapter circuits each include a party store 512, an answer supervision detector 526, zone circuitry 541, control logic 513, a digital-to-analog converter 540, and a busy detector 533. The control logic 513 is responsive to signals from party store 512, the answer supervision detector 526, the zone circuitry 541 and the busy detector 533 to generate one of three outputs on lines 552. The digital-to-analog converter 540 is responsive to the one of three signals on lines 552 to generate a multi-level signal on output line 521 and also to give a busy indication to the busy detector 533.

In FIGS. 5 and 6, the party store 512 receives the signal on line 522 for storing, with regard to a two-party connection, whether the tip or ring party is the calling party. Store 512, therefore, takes the place of the relay 537 in FIG. 4. Store 512 also receives a reset input on line 545 and provides its output to the control logic 513 via line 547.

Referring specifically to FIG. 6, the party store 512 is shown in detail. The circuit is basically a bistable device which has the transistor 631 biased on or off as a function of the input signal on line 522. The input signal on line 522 swings between −48 volts when the calling party is a ring party and ground when the calling party is the tip party. Whenever line 522 is not forced to ground or −48 volts, the store 512 maintains the level on line 522 and line 547 in the appropriate state to indicate either a tip party or a ring party. The NAND gate 630 receives the input signal on line 522, through a resistor network, and also receives an enable signal on line 545 from the busy detector 533. Gate 630 is enabled whenever line 545 is a logical 1. The tip party ground input on line 522 is the equivalent of a logical 1 input to gate 630. With two 1's input, gate 630 produces a 0 output at a −12 volt level which forces transistor 631 on. With transistor 631 on, the −48 volt supply is connected via a resistor to ground through the collector-emitter thereby causing a logical 1 to be maintained and input to the NAND gate 630 even if line 522 is thereafter connected to an open circuit. If input line 522 is forced to −48 volts, a logical 0 is then input to gate 630 causing its output to be a 1 and turning off transistor 631. With transistor 631 off, the ground connected to the −48 volt supply is removed so that a logical 0 is then input to gate 630 holding it with a 1 on its output.

The output line 547 from the party store 512 has a logical 1 or 0 which follows the input 570 to gate 630. More specifically for a ring party, the output on line 547 is a 0 and for a tip party, the output on line 547 is a 1.

In FIGS. 5 and 6, the answer supervision line 523 connects to an answer supervision detector 526 which senses a called party answer and responsively provides a logical 0 output on line 548. Line 548 connects to the control logic 513. Detector 526 has a strap input 546 which is normally connected either to ground or −48 volts depending upon the sense of the answer supervision signal provided on line 523. In some switches, an answer by the called party causes line 523 to be at ground while for other switches, an answer by the called party causes line 523 to go to −48 volts.

In FIG. 6, the details of the answer supervision detector 526 are shown. The EXCLUSIVE-OR gate 629 functions to compare the signal on line 523 with the signal on input 546. Gate 629 produces a logical 0 output whenever the input signal on line 523 agrees with the signal on line 546. Accordingly, for a system in which −48 volts represents a called party answer, input 546 is connected to −48 volts and an answer is indicated by a logical 0 on output line 548. In a system where ground represents a called party answer, input 546 is connected to ground and again a 0 on output line 548 indicates a called party answer.

In FIGS. 5 and 6, the zone circuitry 541 is responsive to sense zone pulses on line 524 and to count and store them for use if an answer signal is detected on line 523. Alternatively, in the absence of any zone pulses on line 524, the zone circuitry stores a predetermined number of zone pulses for use if an answer signal is detected on line 523. Zone circuitry 541 causes the control logic 513 to issue a number of command pulses which equals the number of stored zone pulses. The zone circuitry 541 includes a zone store 527 which is substantially identical to the party store 512. Zone store 527 includes the input on line 524 as well as the reset input on line 545. The zone store provides complementary outputs on lines 549 and 550 which function, under appropriate conditions to provide stepping pulses through the N counter step control 528 to the N zone counter 530 and through the M counter step control 529 to the M zone counter 531, respectively. The N counter step control 528 and the M counter step control 525 receive an up-down line 554. Control 528 receives a command pulse input on line 555 which causes counter 530 to count down whenever the up-down line 554 is energized in the down state. The control 529 receives a command complete signal on line 556 which causes control 529 to cause 531 to count down whenever line 554 is in the down state. The outputs of counters 530 and 531 are connected to the comparator 532 which functions to compare the contents of the counters and perform other comparisons. The comparator 532 produces its output on line 551 which signifies that the count in counter 530 equals the count in counter 531 and the count in counter 530 does not equal 0.

In FIG. 6, the specific details of the zone circuit 541 of FIG. 5 are shown. The zone store 527 operates substantially identically to the party store 512. The output 550 has the same logical sense as the input on line 524. The output on line 549 is the complement of the signal on line 550.

The zone store 527 includes the NAND gate 632 and the transistor 633 which are equivalent to the gate 630 and transistor 631, respectively, in the party store 512. In FIG. 6, the N counter step control 528 includes the NAND gate 634 connected through an inverter to NOR gate 636 and NOR gate 635 connected as the other input gate 636. In a similar manner, the M counter step control 529 includes a NAND gate 637 connected to NAND gate 639 NOR gate 638 connected through an inverter to gate 639. Gates 634 and 637 are enabled by a 1 on line 554. So that a 1 on line 554 signifies an up count. Gates 635 and 638 are enabled by a 0 on line 554 so that a 0 signifies a down count. The counts on line 549 are input through gate 634 and gate 636 to cause counter 530 to count, whenever line 554 is a 1. Similarly, the counts on line 550 are gated through gate 637 and gate 639 to cause counter 531 to count. When line 554 is a 0, line 555 pulses are input through gate 635 and gate 636 to cause counter 530 to count down. When line 554 is a 0, pulses on line 556 are input through gate 638 and gate 639 to cause counter 531 to count down.

In FIG. 6, the N counter 530 and the M counter 531 are conventional binary counters which count up or count down depending upon the 1 or 0 level, respectively, on line 554. Also, counters 530 and 531 can be loaded with the contents of the 4-bit input 553 whenever a signal is applied on line 558. The binary counters provide their parrallel outputs on the 4-bit lines which connect into the comparator 532.

The comparator 532 functions to detect the 0 state of the N counter 530 by means of the NOR gate 593 and to detect the equality of the counts in counters 530 and 531 by means of the EXCLUSIVE-OR gates 586 through 592. If the N counter equals 0, NOR gate 593 produces a 1 output which is connected to the NOR gate 594 and produces a 0 out on line 551. Similarly if the count in counter 530 does not equal the count in counter 531, EXCLUSIVE-OR gates 592 produce a 1 output to the NOR gate 594 and produce a 0 out on line 551. If NOR gate 594 receives any 1 input it produces a 0 output on line 551 which signifies that N is not equal to M or that N does not equal M.

In FIG. 6, the control logic 513 functions in response to a logical 0 on line 548 from the answer supervision detector 526 to remove the clear input on multivibrator 619. With the 1 input to multi-vibrator 619 changed to a 0, multi-vibrator 619 is free to oscillate producing a rectangular wave on its Q* output. The output from multi-vibrator 619 is connected as an input to the flip-flop 622 which is in turn connected as an input to flip-flop 623. Flip flops 622 and 623 function as a shift register which delays the answer supervision signal before it is input to the NAND gate 624. Gate 624 is strobed by the output from multi-vibrator 619 provided it is enabled by the output on line 551 from the comparator 532 in the zone circuitry 541.

The input line 548 also connects to a NAND gate 620. Gate 620 is held with its other input a 1 by the Q* output of flip-flop 623. With a 1 on line 548 before an answer supervision signal, the output of gate 620 is a 0 which together with the enable on the reset line 545 forces a 1 output from gate 621. The 1 output from gate 621 holds both flip-flops 622 and 623 in the clear state with 1's on their Q* outputs. Whenever a 0 is received on line 548 indicating a called party answer, the output from gate 620 goes to 1 and the output from gate 621 goes to a 0 removing the clear on flip-flops 622 and 623 allowing them to shift the outputs from the multi-vibrator 619.

The NAND gate 624, when it provides an output on line 555, enables gates 625 and 626 and disables gate 627. The NOR gate 625 is selected if the party store 512 has a 0 output on the line 547 indicating a tip party calling party. If the output on line 547 is a 1, NOR gate 626 is selected when gate 624 has a 0 output. If neither gate 625 or 626 is selected, and an answer supervision has been received as indicated by the input on line 548 after the appropriate delay through flip-flops 622 and 623, the Q output of flip-flop 623 causes gate 627 to be satisfied thereby allowing a called party disconnect to satisfy gate 627.

The NOR gate 628 has inputs from the Q outputs of flip-flops 622 and 623 and from the compare line 551 as well as the Q* output from bistable multi-vibrator 619. The NOR gate 628 therefore functions to set the parallel load input of counters 530 and 531 if the count in counter 530 does not equal 0 or the count in counter 530 does not equal the count in counter 531 at a time when either flip-flop 622 or 623 has been switched and all occuring during the first negative-going pulse of multi-vibrator 619. The general function of NOR gate 628 is to parallel load the counters 530 and 531 with the inputs on 553 at the last possible moment after the answer supervision is detected.

In FIG. 6, the digital-to-analog converter 540 is shown in further detail. The converter 540 includes the ratio circuit 514, the current detector 515, the free-running generator 518, the skip-pulse generator 519 and the resonant circuit 520. The converter 540 is responsive to the input logic signals on lines 552-1, 552-2 and 552-3 to generate responsively output voltages on the sleeve line 521.

In FIG. 6, the ratio circuit 514 includes the three resistors 601, 602 and 603 which form a ratio with the resistor 604. Only one of the resistors 601 through 603 is energized in response to one of the gates 625 through 627 being energized, respectively. When one of the gates 625 through 627 is energized with a logical 0 output, the selected one of the lines 552-1 through 552-3 is switched from approximately ground to −12 volts. Depending upon the voltage level of the line 521, a signalling current results on line 539.

If the current through the energized one of the resistors 601, 602 and 603 differs from the current through the resistor 604, a differential current is detected by the comparator 605 which provides an output signal on line 560 whcih tends to set the flip-flop 607 to a 0 on its Q output. Flip-flop 607 is set to a 1 on its output by the operation of the astable multi-vibrator 606. The multi-vibrator 606 is free-running and therefore continually sets flip-flop 607 to a 1 on its output. Whenever there is a comparator 605 output, flip-flop 607 gets clocked to a 0 on its output. Each time flip-flop 607 is clocked to a 0 output, transistor 610 is turned on thereby turning on transistor 609. When transistor 609 is on, it connects the line 561 to −48 volts charging the capacitor 612 in the resonant circuit 520. In the absence of the operation of the skip-pulse generator 519, the free-running generator 518 functions to continuously input pulses on line 561 to the resonant circuit 520.

Free-running generator 518 operates in response to the astable multi-vibrator 606. Multi-vibrator 606 continuously puts out pulses to the darlington transistor circuit 608 which turns off and on to generate the pulses on line 561. When accompanied by the operation of the skip-pulse generator 519, the pulses on the line 561 continuously pump energy into the inductor 611 and capacitor 612 so as to apply a voltage on line 521. Voltage on line 521 in turn causes a current through resistor 604. The operation of the skip-pulse generator 619 causes the current through resistor 604 to balance with the current through the resistors 601, 602 or 603 in a feedback manner. When the signals developed by the resistors are equal, as previously described, no output is derived from comparator 605.

The details of the converter 540 operation are described in connection with the waveforms of FIG. 9. The converter 540 operates under three modes. The first mode is a low-power mode with no current in the sleeve line 521. The second mode is a low-power mode with current in the sleeve line 521. The third mode is a high-power mode with current in the sleeve line 521.

The low-power mode with no current in line 521 occurs when none of the lines 552-1 through 552-3 are energized and therefore are at ground potential. Further, line 521 is connected to an open circuit (e.g. S1 in FIG. 3 is open) and the voltage on line 521 is maintained at a high level (+48 volts). The positive signal on line 521 is input to the comparator 605 on line 559 which maintains the output on line 560 at a logical one level. The logical one level is continuously maintained as an input to the flip-flop 607 which in turn maintains its Q output at 1 for the entire operation of the low-power mode. With the Q output of flip-flop 607 a 1, transistors 610 and 609 are both turned off for the duration of the low-power mode.

During all modes of operation including the low-power, no current mode, the multi-vibrator 606 continuously produces a square wave on its Q and Q* outputs. Referring to FIG. 9, the waveform 608, while directly representing the ON/OFF state of transistor 608, is also representative of the waveform of the Q* output of the flip-flop 606. Each time the output 606 Q goes to a 0 transistor 608 is turned on connecting the collector line 561 to ground.

Figure 9:
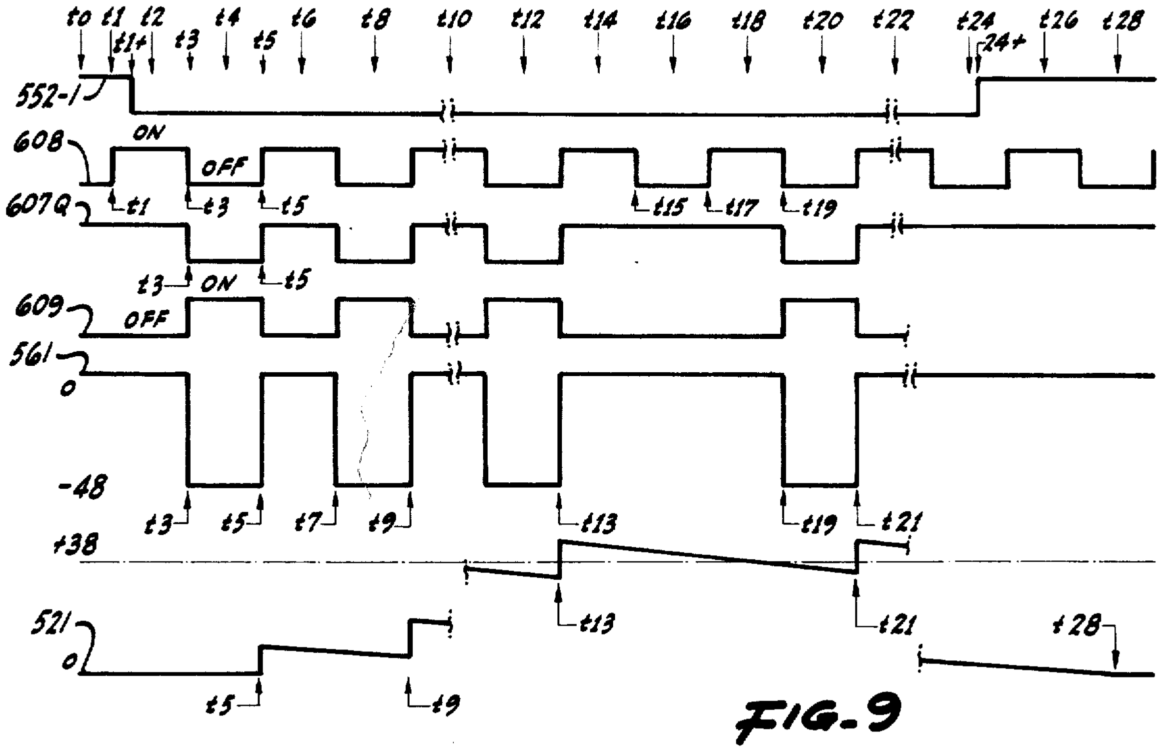
FIG. 9 depicts a schematic representation of waveforms descriptive of the operation of the digital-to-analog converter in the trunk adapter circuit of FIG. 5.

Referring to FIG. 9, under the low-power mode without current, the collector line 561 is connected to ground potential, between *t1* and *t3*, between *t5* and *t7* and so forth. When line 561 is at ground potential, a charge contained across capacitor 612 is delivered to capacitor 616 through a current path which appears from ground through transistor 608, inductor 611, capacitor 612, diode 613, and capacitor 616 to ground. When transistor 608 is not conducting, a charging current path exists from ground through diode 596, through capacitor 612, through inductor 611, through resistor 615, to the −48 volt supply. During the charging mode, a plus to minus drop occurs across capacitor 612 in the direction from diode 596 to inductor 611. When transistor 608 is again conducting, a discharge path occurs from ground through transistor 608, along collector line 561 through inductor 611, capacitor 612, diode 613, and capacitor 616 to ground. This discharge path tends to cause a plus to minus drop across capacitor 616 in the direction from diode 613 to ground. The charge which was across capacitor 612 as a result of the charging path is transferred to capacitor 616 as a result of the discharge path. This charge transfer process continues for each on and off cycle of transistor 608 thereby tending to build a positive charge of approximately +48 volts on line 521. This high positive voltage on line 521 is detected both by current detector 515 to hold the logical output on line 560 at a 1 and by line 557 to hold the logical input to the busy detector 523 at a 1.

The low-power mode with current commences after a local subscriber goes off hook and dials a called party. In response to the dialing, the switching circuit 5 in FIG. 3 causes a trunk line to be selected and connected to the subscriber lines. In this manner the calling subscriber connected on the subscriber lines 505 is connected to a trunk line of the trunk lines 518. When a subscriber sleeve line in the frame 506 is connected to a trunk adapter sleeve line 521, the sleeve line 521 at that time is no longer connected to an open circuit and becomes connected through approximately 300 ohms to a −48 volt supply in the line and trunk links 507 and 508. This connection causes current in sleeve line 521 and causes the +48 volt open circuit voltage on line 521 to decay to approximately −1 volt.

In the low-power current mode, the voltage on line 521 (−1 volt) is approximately the same as the voltage on the lines 552 so that comparator 605 continues to maintain a logical 1 on the line 560. Therefore flip-flop 607 maintains a 1 on its Q output which continuously holds the transistor 610 and therefore the transistor 609 off. The free-running generator 518 continues to turn transistor 608 on and off and to ground the collector line 561 in alternate half cycles. Referring to FIG. 9, line 561 is at ground potential between *t1* and *t3*, between *t5* and *t7*, and so on. Between *t3* and *t5* and other similar periods when transistor 608 is off, a small charge is introduced into capacitor 612 via resistor 615. With transistor 608 off, a charge current passes from ground through diode 596 placing a plus to minus drop across capacitor 612 through inductor 611, resistor 615 to −48 volts. This charging current tends to establish a small voltage drop across capacitor 612. When transitor 608 is again turned on connecting line 561 to ground, capacitor 612 transfers that small charge to capacitor 616. Because of the low impedance load on line 521 the small charge on capacitor 616 will not cause the voltage to rise from −1 volt. With that voltage on line 521, the signal on line 557 through resistor 640 appears as a logical 0 which signals that the trunk circuit has gone from not busy to busy. The logical 0 on line 557 is detected by the busy detector 523 to remove the inhibit signal on line 545 and thereby enables the party store 512, the zone store 527 and the control logic 513.

The high-power mode of the converter 540 occurs after an answer supervision signal appears on line 523 and after the inhibit signal has been removed from line 545. With the inhibit removed and the answer supervision signal, one of the gates 625 or 626 has a 0 output producing a logical 0 on either line 552-1 or line 552-2. Assuming for simplicity that line 552-1 is energized with a logical 0, (−12 volts) the −3 volts on line 521 causes less current in line 559 than the −12 volts on line 552-1 yielding a signal on line 559 which in turn causes the comparator 605 to switch its output from 1 to 0.

Referring now to FIG. 9, the 1 to 0 transition of gate 625 is shown by the waveform 552-1 at *t1*+. The astable multi-vibrator 606 turns off and on independent of any other circuit operation thereby causing transistor 608 to turn off and on at times *t1*, *t3*, *t5* and so on as shown by waveform 608 of FIG. 9. Transistor 608 is on between *t1* and *t3*, between *t5* and *t7* and so on. With a 0 on line 552-1, the line 560 is a 0 after *t1*+. At time *t3*, the 0 on line 560 is clocked into flip-flop 607 causing the 607Q output to be a 0 between *t3* and *t5*. The 0 on 607Q forces on transistor 610 which in turn forces on transistor 609. With transistor 609 on, the −48 volt supply is connected directly to collector line 561 during the time when transistor 608 is off. The effect of transistor 609 is to bypass the low-power resistor 615. When resistor 615 is in the circuit, that is transistor 609 is off, the charging current through diode 596, capacitor 612, inductor 611 and resistor 615 has less power than when through inductor 611 directly via transistor 609 to −48 volt supply. The greater power into capacitor 612 allows it to build up a full 48 volt charge.

In FIG. 9, the charging current through capacitor 612 occurs between *t3* and *t5* which is the time when the transistor 609 is on. Between *t5* and *t7*, when transistor 609 is off and line 561 is connected to ground through transistor 608 in the on condition, capacitor 612 transfers its charge to capacitor 616. As shown at *t5*, a burst of energy is input to capacitor 616 when the voltage on line 561 switches from −48 to ground.

At *t5*, the logical 1 on the Q* output of flip-flop 606 sets the output of flip-flop 607 to a logical 1 turning off transistor 609 during the time when transistor 608 turns on. Even though at *t5* the voltage on line 521 has gone somewhat positive, the ratio circuit 514 still causes a signal to the current detector 515 calling for a further increase in the voltage on line 521. Hence at time *t7*, flip-flop 607 is again clocked to store a 0 on its Q output, again turning on transistor 609 and again causing a large charge current through capacitor 612 between *t7* and *t9*. At *t9*, capacitor 612 transfers its charge to capacitor 616 causing a further build up in the voltage on line 521. This charging process continues until, after some duration indicated by the break at *t10*, a charge transfer occurs at *t13* which causes the voltage on line 521 to exceed +38 volts as commanded by the signal on line 552-1. Even though the voltage on line 521 continues to decay after *t13*, at *t15* it still exceeds the commanded voltage so that the flip-flop 607 at this time does not get set to 0 but remains set at logical 1 thereby skipping a pulse by not turning on transistor 609. At some point, for example at *t19* the voltage on line 521 is again below the commanded voltage on line 552 so that a new pulse occurs at *t21* which again forces the voltage above the commanded +38 volts. Again after some duration indicated by the break at *t*22, the commanded voltage on line *t*24+ is removed and the signal on line 521 is allowed to decay again down to ground as indicated at *t*28.

While the description of the converter 540 has been given with respect to the commanded voltage of +38 volts on line 552-1, a +18 volts is caused on line 521 when gate 626 is energized and +10 volts is commanded when gate 629 is energized. The difference in voltages which occur on line 521 are caused by the difference in ratio between the resistors 601, 602 and 603 with regard to the feedback resistor 604.

In FIG. 6, the busy detector 523 or 553 includes the AND gate 617 and the NAND gate 618. Gates 617 and 618 receive the input on line 557 which functions to sense the sleeve line 521 voltage as controlled by the converter 540. Gates 617 and 618 also receive the command pulse line 555 where that input to gate 617 is inverted. The output from gate 617 feeds via line 556 as an input to the M counter control 529 for decrementing counter 531 through NOR gate 638 and NAND gate 639.

Line 557 is a logical 1 whenever sleeve line 521 is an open circuit, +38 or +18 volts. Line 557 is a logical 0 whenever line 557 is −3 volts or +8 volts.

Gate 617 receives the inverted command pulses from line 555. Each command pulse after inversion includes a trailing edge which is a 1 to 0 transition. The leading edge transition causes gate 617 to have a 0 to 1 output on line 556 which is propagated through the M counter control 529 as a 0 to 1 transition on line 569 which decrements the M counter 531.

If line 557 is a 0, the output of gate 617 is forced to a 0 and any transition on line 555 is not transmitted through gate 617 and therefore the M counter 531 cannot be decremented.

The function of gate 618 is to reset and hold reset the party store 512, the zone store 527, and the control logic 513. Whenever the output on line 545 is a 0, NAND gates 630 and 632 have their outputs forced to a 1 and do not follow the inputs on lines 522 and 524, respectively. Also, a 0 on line 545 forces the output of gate 621 to a 1 holding the flip-flops 622 and 623 in a cleared state with a 1 on their Q* outputs.

Gate 618 has a 1 on its output 545 in response to a 0 input on line 557 which signifies a busy condition. Under the not busy condition where the sleeve voltage is −48 volts and the sleeve line 521 is connected to an open circuit, a logical 1 is presented on line 557. When sleeve line 521 thereafter becomes connected, the sleeve voltage goes to −3 volts forcing line 557 from a logical 1 to a logical 0. When the logical 0 is input to gate 618, its output is forced to a 1 thus enabling the party store 512, the zone store 527 and the control logic 513.

A/D Converter

Figures 7, 8:
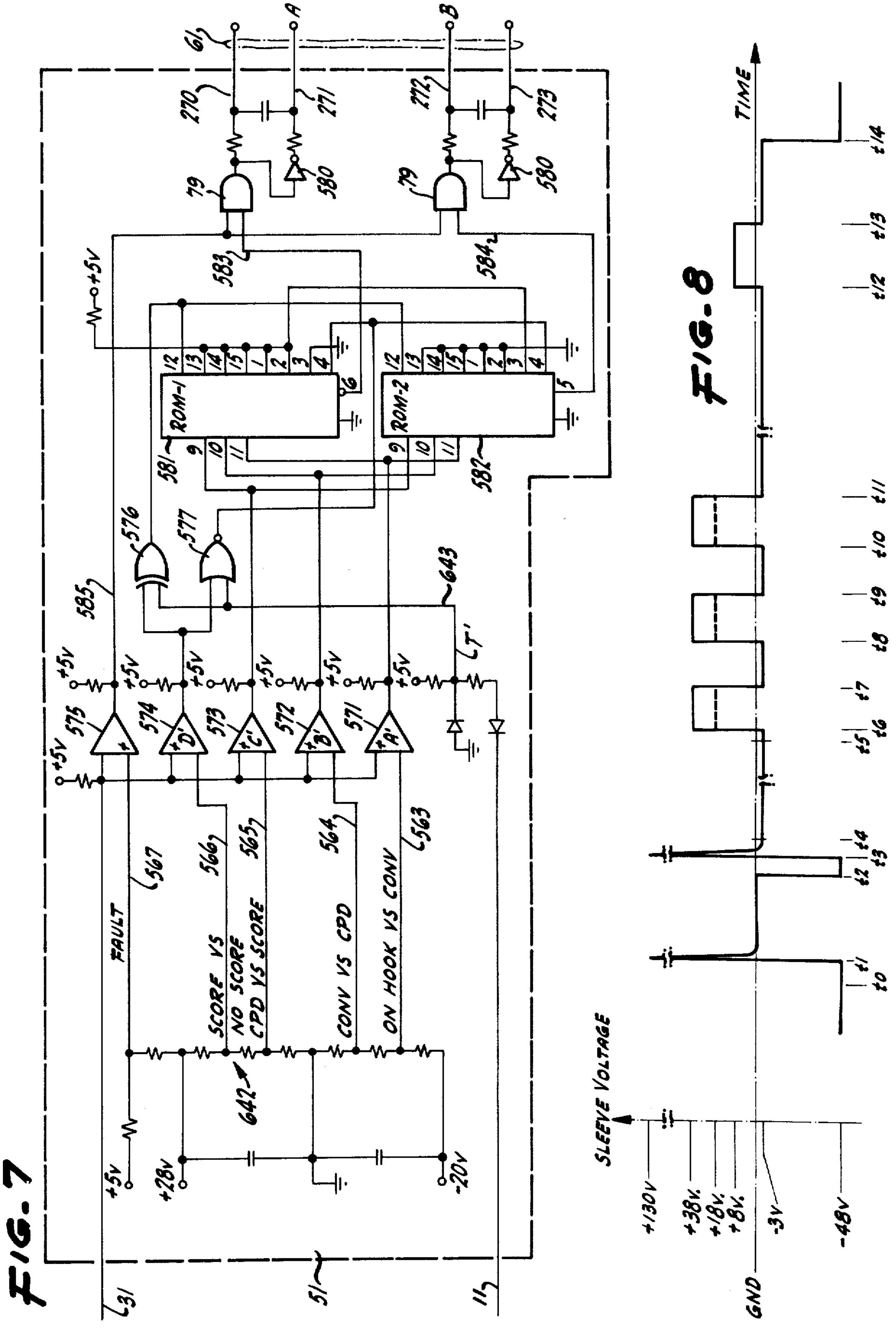
FIG. 7 depicts a schematic representation of an analog-to-digital converter employed within the scanner banks of FIG. 2.
FIG. 8 depicts a waveform representative of the sleeve lead voltage generated by operation of the apparatus of the present invention.

In FIG. 7, the A/D converter from the scanner bank 8 of FIG. 2 is shown in detail. Input line 31 receives the multi-level signal, originally generated by a trunk adapter circuit 502, and forms an encoded binary output on the output lines 61. Each of the two output lines 61 are differential as indicated in FIG. 7 by the line pair 270 and 271 and the line pair 272 and 273.

The A/D converter 51 includes comparators 571 through 575 which each compare the multi-level input signal on line 31 with different threshold voltages. The comparators 571 through 575 each form two-level digital outputs which are then encoded into the two binary signals on lines 61. The input thresholds on lines 563 through 567 are derived from a resistive divider network 642 which is connected at −20 volts, ground, +5 volts and +28 volts. The nominal voltage on line 563 is −1.5 volts and functions to detect an on hook versus conversation level of line 31. The nominal voltage on line 564 is −0.06 volts and functions to detect a conversation versus called party disconnect condition. The nominal voltage on line 565 is 0.78 volts and functions to detect a called party disconnect versus score condition on line 31. The nominal voltage on line 566 is 1.6 volts and functions to detect a score versus no score condition on line 31. The nominal voltage on line 567 is 5.2 volts and functions to detect a fault condition in the diode gate within the LIU 26 in a manner previously described in the above-referenced application SAMPLING AND ANALOG-TO-DIGITAL CONVERTER APPARATUS FOR USE IN A TELEPHONE MESSAGE METERING SYSTEM.

The outputs from comparators 571, 572 and 573 serve as inputs to the read-only memories 581 and 582. The output from comparator 574 is input to the EXCLUSIVE OR gate 576 and the NOR gate 577. The input to gates 576 and 577 is derived from the resistor diode network connected to input line 562. Line 562 is a test line input which is employed to test the operation of the LIU 26. The output from NOR gate 577 is also an input to the read-only memories 581 and 582. Read-only memories 581 and 582 produce outputs on lines 583 and 584 which are propagated to lines 61 as data bits. The first data bit is on line 270 as referenced to line 271. The second data bit is on line 272 as referenced to line 273. The functioning of the read-only memories to produce the outputs on lines 270 and 272 is given in connection with the following CHART I. In CHART I, the inputs A′, B′, C′, D′, and T′ represent the signals from the comparators 571, 572, 573, 574 ad from line 643, respectively, and the outputs A and B correspond to the signals on lines 271 and 272, respectively.

CHART I

| INPUT STATE | | | | | OUTPUT STATE | | COMMENTS |
|---|---|---|---|---|---|---|---|
| T′ | D′ | C′ | B′ | A′ | B | A | |
| 1 | 1 | 1 | 1 | 1 | 0 | 0 | normal no score or +LIU test |
| 1 | 1 | 1 | 1 | 0 | 0 | 1 | Fault |
| 1 | 1 | 1 | 0 | 1 | 0 | 1 | Fault |
| 1 | 1 | 1 | 0 | 0 | 0 | 1 | Fault |
| 1 | 1 | 0 | 1 | 1 | 0 | 1 | Fault |
| 1 | 1 | 0 | 1 | 0 | 0 | 1 | Fault |
| 1 | 1 | 0 | 0 | 1 | 1 | 0 | Fault |
| 1 | 1 | 0 | 0 | 0 | 0 | 0 | Fault |

CHART I – Continued

| INPUT STATE | | | | | OUTPUT STATE | | COMMENTS |
|---|---|---|---|---|---|---|---|
| 1 | 0 | 1 | 1 | 1 | 1 | 1 | normal score |
| 1 | 0 | 1 | 1 | 0 | 0 | 1 | Fault |
| 1 | 0 | 1 | 0 | 1 | 0 | 1 | Fault |
| 1 | 0 | 1 | 0 | 0 | 0 | 1 | Fault |
| 1 | 0 | 0 | 1 | 1 | 0 | 1 | normal called party disconnect |
| 1 | 0 | 0 | 1 | 0 | 0 | 1 | Fault |
| 1 | 0 | 0 | 0 | 1 | 1 | 0 | normal conversation |
| 1 | 0 | 0 | 0 | 0 | 0 | 0 | normal on hook |
| 0 | 1 | 1 | 1 | 1 | 1 | 1 | Fault |
| 0 | 1 | 1 | 1 | 0 | 0 | 1 | Fault |
| 0 | 1 | 1 | 0 | 1 | 0 | 1 | Fault |
| 0 | 1 | 1 | 0 | 0 | 0 | 1 | Fault |
| 0 | 1 | 0 | 1 | 1 | 0 | 1 | Fault |
| 0 | 1 | 0 | 1 | 0 | 0 | 1 | Fault |
| 0 | 1 | 0 | 0 | 1 | 1 | 0 | Fault |
| 0 | 1 | 0 | 0 | 0 | 0 | 0 | Fault |
| 0 | 0 | 1 | 1 | 1 | 0 | 0 | Fault |
| 0 | 0 | 1 | 1 | 0 | 0 | 1 | Fault |
| 0 | 0 | 1 | 0 | 1 | 0 | 1 | Fault |
| 0 | 0 | 1 | 0 | 0 | 0 | 1 | Fault |
| 0 | 0 | 0 | 1 | 1 | 0 | 1 | Fault |
| 0 | 0 | 0 | 1 | 0 | 0 | 1 | Fault |
| 0 | 0 | 0 | 0 | 1 | 1 | 0 | Fault |
| 0 | 0 | 0 | 0 | 0 | 1 | 1 | –LIU test |

Zone Pulse Generator-FIG. 10

In FIG. 10, the zone pulse generator 646 of FIG. 3 is shown. The input lines 647 connect the zone pulse generator 646 to the marker and control 511. The lines 647 include the input control line 648, the 15 route-series relay lines 649, the output control line 650 of the zone line 651.

The fifteen lines 649 connect from the route-series relays in the marker and control 11 to the route-to-zone encoder 652. The encoder 652 is a conventional 15-to-4 binary encoder which provides 4 binary outputs which define the one of fifteen intputs which is energized. The binary output from encoder 652 is stored in a 4-bit register 653 at a time controlled by input control line 648. The four bits in the register 653 are input to the parallel-to-serial converter 654. The converter 654 under control of control logic 656, at a time determined by output control line 650, puts out a number of pulses equal to the count stored in register 653. The pulses are output through a transfer circuit 655 on to line 651. The transfer circuit 655 is of the self-verifying type. After putting out a pulse on line 651, circuit 655 goes to an open circuit to verify if the output pulse on line 561 was received and stored by the zone store 527. Zone store 527 is in the zone circuit 541 of FIG. 5. If a pulse is not stored by store 527, then a signal is input to the control logic 656 which terminates further operation by converter 654, and indicates an alarm.

In FIG. 3, the zone line 651 connects from the generator 646 through the marker and control 511 and is one of the two lines 525. The other of the two lines 525 is the party line. The party line connects in a conventional manner from the marker and control 511 to the trunk link 508 and from there to the trunk circuit 509 where it appears as the party line 522 (TP lead). In the trunk link 508 and trunk circuit 509, a number of relay contacts exist in the party line for opening and closing the party line in a conventional manner. The newly added zone line 651, follows a path through the trunk link 508 and the trunk circuit 509 which is an identical duplicate of the party line path. In this manner the zone line 651 in FIG. 10 becomes connected to the zone line 524 in FIG. 4 under the same conditions and at the same time with the party line 522 becomes connected. After connection by the marker, line 650 is energized to cause the zone pulses to be counted out on line 651 for storage in the M and N counters of FIGS. 5 and 6.

SUMMARY OF OPERATION

The system of FIG. 1 generates and detects multi-level signals on the sleeve leads in the switching circuits of a telephone system in order to meter local subscriber usage of the telephone system. In FIG. 8, the waveform is representative of the voltage on a typical one of the subscriber sleeve leads at the main distribution frame 506 in FIG. 3. Specifically and by way of example, the waveform is representative of the signal on line 7'-2 in FIG. 3. The voltage on line 7'-2 is, under most conditions, the same as the voltage on the corresponding sleeve line 521 in the trunk circuit 509 of FIG. 4. The voltage on line 7'-2 differs from the voltage on line 521 prior to the connection of those two lines by the switching circuitry 5 in response to a calling party call to a called party. When the calling party is on hook and until the time that the marker in the marker and control 511 connects lines 7'-2 to line 521, line 521 is connected to an open circuit and is at a +48 volts in the low power, no current mode. The sleeve voltage on typical line 7'-2 prior to connection to line 521 is controlled by the on or off hook condition of the calling subscriber.

In FIG. 3, subscriber line 7'-2 is associated with the local subscribers 504-2 and 504-3. Local subscribers 504-2 and 504-3 are connected in a two-party connection on tip and ring lines 505-2. The two lines 505-2 are associated with a unique set of the three lines 517 where the third line in that set is the subscriber sleeve line. That subscriber sleeve line associated with lines 505-2 is in turn connected in frame 506 to the line 7'-2. For purposes of the present explanation, local subscriber 504-2 is assumed to be the tip party and subscriber 504-3 is assumed to be the ring party.

The waveform of FIG. 8 is representative of the voltage signal on subscriber sleeve line 7'-2 associated with local subscribers 504-2 and 504-3. In FIG. 8, the period *t*0 through *t*3 represents the time prior to the connection of the subscriber lines to the trunk lines. During this period from *t*0 to *t*3, line 521 remains in the low power, no current mode at +48 volts. Line 7'-2 at *t*0 is at –48 volts as controlled in a conventional manner by operation of the line link 507. At *t*1, when a subscriber associated with the sleeve line 7'-2 goes off hook, a large positive spike appears on line 7'-2. The spike quickly returns to the ground potential between $t1$ and $t2$.

Assuming that the tip party 504-2 is the calling party, the positive spike and return to ground occurs when subscriber 504-2 goes off hook. During the period between $t1$ and $t2$, subscriber 504-2 dials a called party. The function of the switching circuit 5 is to connect the subscriber lines 505-2 to an appropriate one of the trunks 510-1 or 510-2 through which a connection is made to the called party. The marker and control circuitry 511 makes the connection of the subscriber lines 505-2 to the trunk lines 510 in a conventional manner.

In making the connection of the calling subscriber to the trunk, the switch 5 also functions to connect the subscriber sleeve line 7'-2 to the associated trunk sleeve 521. Also, the party and zone lines 522 and 524 are connected to lines 525 and the party and zone information is stored in control 511. The answer supervision line 523 is made ready to transmit an answer signal when the called party answers.

The marker commences its connection at time $t2$ by momentarily returning the line 7'-2 to −48 volts and at $t3$ by connecting line 7'-2 to line 521. At $t3$ the subscriber 504-2 is connected to an appropriate trunk line 510. After time $t3$ and referring to FIG. 8, lines 7'-2 and 521 are connected in common and hence have the same voltage waveform. At time $t3$, the voltage on line 521 goes from +48 volts to the high positive spike returning to a −3 volts at approximately $t4$.

The following CHART II is to be used in conjunction with the waveform of FIG. 8. In CHART II, the times $t0$ through $t14$ correspond to the times in FIG. 8. The sleeve current is that in the line 521. The answer supervision signal is the one received on line 523. The sleeve voltage is the voltage on line 7'-2. For the period from $t0$ until $t3$, as previously explained, the voltage on line 521 is +48 volts and thereafter is the same as line 7'-2 until disconnect at $t14$.

CHART II

| TIME | L521 SLEEVE CURRENT | L523 ANS. SUP. | L7'-2 SLEEVE VOLTAGE | COMMENTS |
|---|---|---|---|---|
| t0 | NO | NO | −48 | ON HOOK |
| t1 | NO | NO | 0 | OFF HOOK |
| t2 | NO | NO | −48 | MARKER DROPS |
| t3 | YES | NO | −3 | STORE PARTY, ZONE |
| t4 | YES | NO | −3 | RINGING |
| t5 | YES | YES | −3 | CALLED PARTY ANS. |
| t6 | YES | YES | V* | ZONE PULSE-1 |
| t7 | YES | YES | −3 | PULSE-1 END |
| t8 | YES | YES | V* | ZONE PULSE-2 |
| t9 | YES | YES | −3 | PULSE-2 END |
| t10 | YES | YES | V* | ZONE PULSE-3 |
| t11 | YES | YES | −3 | PULSE-3 END |
| t12 | YES | NO | +10 | CALLED PARTY DIS. |
| t13 | YES | YES | −3 | RECONNECT |
| t14 | NO | NO | −48 | ON HOOK |

V* = +18v IF RING PARTY
V* = +38v IF TIP PARTY

Referring now to FIG. 6 for the period from $t0$ until $t3$, a +48 volts on line 521 is connected through to line 557 as a logical 1 which forces the busy detector output on line 545 to logical 0. That logical 0 on line 545 is an inhibit signal which holds reset the zone store 527, the party store 512 and the control logic 513.

After reconnection by the marker at $t3$, the waveform of FIG. 8 has a high positive spike which rapidly decays. After $t3$, the signal on line 557 goes to a logical 0 causing the busy detector 533 to have a logical 1 output on line 545. The logical 1 on line 545 causes the store 512 to latch in accordance with the ring party or tip party signal on line 522. In the present example, the signal is ground and stores a logical one identifying a tip party. The signal on line 522 is issued in a conventional manner in response to the marker and control 511 in FIG. 3. Also after time $t3$, the zone pulses are counted into the N counter 530 and the M counter 531 through the enabled zone store 527. Those signals occur on zone line 524 in the manner previously described in connection with the zone generator of FIG. 3. With the party stored and the zone count stored at time $t4$, ringing occurs during the period between $t4$ and $t5$. At time $t5$, an answer signal appears on line 523. The sleeve lead voltage remains at −3 volts for a charge delay period between $t5$ and $t6$. After $t6$, the multi-level signal generator identified as a trunk adapter circuit 502 causes the voltage on the sleeve lead 521 to rise to a value V* where V* is +18 volts if the ring party is the calling party or +38 volts for the present example where the tip party is the calling party.

At $t5$, the output 0 on line 548 of FIG. 6 removes the clear input on the astable multi-vibrator 619 while forcing the output of gate 620 to a 1. The enable 1 on line 545 in combination with the 1 output from gate 620 forces the output from gate 621 to a 0 also removing a clear input on flip-flops 622 and 623. The multivibrator 619 causes a logical 1 to shift through the shift register stages 622 and 623 in two successive pulses to provide a 1 input to gate 624 via the Q output from flip-flop 623. That 1 input to gate 624 coupled with a 1 input from the Q* output from multi-vibrator 619 satisfies NAND gate 624 provided a 1 is present on comparison line 551 from comparator 532.

Comparator 532 has an output 1 at time $t5$ provided the counts in the N counter 530 and M counter 531 are equal and provided the count in counter 530 is not equal to 0. If no zone pulses were received on line 524 prior to the answer supervision signal on line 523 at time $t5$, the 0 on line 551 in combination with the 0 from the Q* outputs from flip-flops 622 and 623 and 619 will force a 1 output on line 558 which causes counters 530 and 531 to be parallel loaded with the signals on input straps 553. With counters 530 and 531 so loaded, the output on line 551 now becomes a 1 inhibiting the 1 output from NOR gate 628 but now satisfying NAND gate 624. With gate 624 satisfied, there is a 1 to 0 leading edge transition on line 555 which initiates the first command pulse.

The first command pulse 0 on line 555 at time $t6$ selects OR gate 625 or OR gate 626 depending on the stored party in store 512. Assuming that party store 512 is storing a tip party with a logical 1 on line 547, gate 626 is selected to produce a logical 0 of −12 volts on line 552-2. That signal is input to the digital-to-analog converter 540 and causes the feedback resistor 604 and the resistor 602 to have unequal currents which cause comparator 605 to have a logical 0 output until the currents become balanced. The free-running generator 518 and the skip-pulse generator 519 operate to adjust the voltage on line 521 to +38 volts and balance the currents and force the comparator 605 output to 1. This +38 volts occurs as a result of the initial 1 to 0 transition on line 555 of the command pulse.

With line 555 going to a 0, the input to gate 617 in busy detector 523 is a logical 1 which together with the +38 volts on line 521 force the output of gate 617 to a 1. The leading edge transition from 1 to 0 on line 555 forces gate 618 to have a logical 1 output maintaining the enable on line 545. Prior to the transition from 1 to 0 on line 555, the signal on line 521 was a −3 volts which provided a logical 0 input to gate 618 which also held the output line 545 enabled. Accordingly, during the 0 portion of the command pulses on line 555 the output on line 545 is held enabled by that 0 condition. Whenever the output on line 555 is a 1, the output on line 521 causes line 557 to be a logical 0 so that line 545 is also maintained enabled. During the trailing edge of the command pulse on line 555, the 0 to 1 transition is propagated through the N counter control 528 to decrement the N counter 530. During the trailing edge of the command pulse on line 555, the 0 to 1 transition on line 555 causes a 1 to 0 input to gate 617 which in turn causes a 1 to 0 transition on line 556. That 1 to 0 transition on line 556 is detected by the M counter control 529 to cause the M counter to be decremented by 1 count. Accordingly, both counters 530 and 531 are decremented during the trailing edge of the command pulse on line 555.

The leading edge of the first command pulse is caused by the 1 input from the Q output of flip-flop 623 and the Q* output of flip-flop 619. The trailing edge of the command pulse on line 555 is caused by the operation of the astable multi-vibrator 619. Whenerver the multi-vibrator 619 Q* output goes to 0, the output of gate 624 is forced from 0 to 1. Flip-flop 623 remains with a 1 on its output and line 551 remains with a 1 on its output while the multi-vibrator 619 continues to cause gate 624 to issue command pulses thereby decrementing counters 530 and 531 in the manner described in connection with the first command pulse. The counters 530 and 531 are decremented until they each contain 0 or N is not equal to M.

In connection with the waveform of FIG. 8 and CHART II, it was assumed that three pulses were input to counters 530 and 531 as a typical example of a zone count. Accordingly, the three zone pulses occur, respectively, between *t*6 and *t*7, between *t*8 and *t*9, and between *t*10 and *t*11. After *t*11, counter 530 is again at a 0 count so that the output on line 551 from comparator goes to 0. The 0 on line 551 is input to gate 624 forcing its output to a 1 and inhibiting any further command pulses by multi-vibrator 619 from being propagated through gate 624. Since the flip-flop 623 still has a 1 on its Q output, NOR gate 628 is not satisfied so that no new count is loaded into the counters 530 and 531.

At time *t*12, it is assumed that a called party disconnect occurs thereby forcing the sleeve voltage to +8 volts in the manner now described. The reversal of the answer supervision signal causes the outputs from gate 629 to go form 0 to 1. The 1 on line 548 is connected as an input to gate 627 which had been previously held, with a 0 input on line 548, to a 1 output. Gate 629 is therefore selected causing the converter 540 to produce the +8 output on line 521. If the called party is reconnected as occurs at *t*13, gate 627 is again inhibited and the voltage on line 521 returns to −3 volts.

At time *t*14, the called party goes on hook again recreating the condition which occurred on time *t*0.

Ring and Tip Party Addressing

In FIG. 2, the LIU 26, under control of the line decoder 30, address the 16 input lines, such as lines 7', one at a time and connects the selected line to the output lines, such as lines 28. The LIU 26 functions to attenuate the signal on each addressed input line by a factor of approximately 13. Up to 16 LIU 26 have their output lines, such as lines 28, connected as inputs to the analog gates, such as analog gate 41. The analog gates like gate 41 in turn, under control of the decoder 32, function to select the input lines, such as lines 28, one at a time and connect them to the output line, such as line 31.

Referring to FIG. 3, the multi-level signal of FIG. 8 is generated in the trunk adapter circuit 502 and is propagated along the sleeve line through the trunk circuit 509, the trunk link 508, the line link 507 to the frame 506 where it appears on line 7'-2. In FIG. 2, the line 7'-2 connects as one input to the line interface unit 26 and also to the tip attenuator 539. The tip attenuator 539 functions to reduce the amplitude of the signal on line 7'-2 by a factor of 2. The signal on line 7'-2 and the reduced signal on line 7'-3 are each input to the same LIU 26. Although shown input to the same LIU 26 in FIG. 2, the line 7'-2 may go to one LIU while the line 7'-3 may go to a different LIU.

The scanner bank 8 of FIG. 2 operates to address a ring party when line 7'-2 is connected to line 31. Similarly, the scanner bank 8 addresses a tip party when the line 7'-3 is connected to line 31. The tip party signal on line 7'-3 is attenuated by a factor of 2 in the tip attenuator 539 compared with the signal on line 7'-2.

Ring Party Addressed

Under the conditions that the scanner bank of FIG. 2 has addressed line 7'-2 and connected it to the input line 31 of the A/D converter 51, the waveform of FIG. 8 as attenuated and filtered is detected by the converter 51.

Referring to FIG. 7 and FIG. 8, the operation of the converter 51 for an addressed ring party is as follows. The voltage spikes at *t*1 and *t*3 in the waveform of FIG. 8 are removed by appropriate filtering in the LIU 26 and the analog gate 41 so that the signal on line 31 does not have a substantial positive signal until *t*6. The output of the converter 51 prior to the time *t*4 is substantially ignored by the scanner bank adapter 10 of FIG. 10 and accordingly, the operation of the converter 51 is described for the period after *t*4 in the waveform of FIG. 8. With an input of −3 volts at *t*4, the signal on line 31 is reduced to approximately −0.2 volts which is well above the −1.5 volt threshold on line 563 and well below the −0.06 volt threshold on line 564. Under these conditions the outputs from comparators 572, 573, 574 and 575 are all logical 0 while the output from comparator 571 is a logical 1. Referring now to the above CHART I, the AB output from converter 51 is 01 which indicates a normal conversation mode. Since no positive signal, as occurs later at *t*6, has appeared on line 31, the scanner bank adapter of FIG. 1 ignores this normal conversation output from the decoder of FIG. 7 until a "normal score" occurs.

If the calling party is a ring party, then the input signal at *t*6 of +18 volt signals a "score". The +18 volt signal is attenuated by a factor of 13 and appears on line 31 as approximately +1.38 volts. The +1.38 volt signal is below the threshold of +1.6 volts on line 566 but above the thresholds on lines 562 through 565. Under this condition, a logical 0 is output from comparator 574 and referring to CHART I above, the "normal score" output of logical 1's on outputs A and B is generated.

If at $t6$, the voltage on line 7'-2 jumps to +38 volts signifying that the tip party is the calling party, then the voltage on line 31 is +2.9 volts. The +2.9 volts exceeds the thresholds on all lines 563 through 566 in FIG. 7 so that the logical outputs from comparators 571 through 574 are all 1's. Referring again to CHART I, the all 1's condition produces the "normal no score" conditions causing 0's on outputs A and B. The no score condition occurs because the line 7'-2 input to the LIU 26 is associated with a tip party and not a ring party.

In summary, the tip party is the calling party, and the addressing circuitry of FIG. 2 addresses the ring line 7'-2, the converter 51 outputs a "normal no score" signal. When the ring party is the calling party and the addressing circuitry of FIG. 2 addresses the ring line 7'-2, the converter 51 outputs a "normal score" signal. For the periods from $t7$ to $t8$, $t9$ to $t10$, $t11$ to $t12$, and $t13$ to $t14$, the output from converter 51 is "normal conversation". If the "normal score" condition was detected after $t6$, as will be the case if the ring party is the calling party, the scanner bank adapter of FIG. 2 records the duration of the conversation mode call.

If a called party goes off hook as occurs between $t12$ and $t13$, the +8 volts on line 7'-2 is attenuated to +0.615 volts on line 31. The +0.615 volts exceeds the threshold values on lines 563 and 564 but is less than the threshold values on lines 565, 566 and 567. Under these conditions, again referring to CHART I, the "normal called party disconnect" condition exists.

At $t13$ in the waveform of FIG. 8, the called party reconnects and the conversation continues until some later time, for example $t14$, when the calling party goes on hook. At $t14$, with the −48 volts on line 7'-2, the voltage on line 31 is converted to −3.7 volts which is below the threshold on all lines 563 through 567. Under these conditions, the outputs A and B are logical 0's indicating the "normal on hook" condition.

Tip Party Addressed

When the tip party line 7'-3 is addressed by the circuitry of FIG. 2, the converter 51 functions to reject ring party signals and accept tip party signals.

When a −3 volt signal is applied to the line 7'-2, it is not attenuated reduced in the tip party attenuator 539 because diode 662 in FIG. 11 prevents attenuation of negative signals. The −3 volts appears on the line 7'-3 and is attenuated in LIU 26 to −.2 volts. the −0.2 volts is greater than the threshold on line 563 but less than the thresholds on lines 564 through 567. Accordingly, whenever the signal on line 7'-2 is −3 volts, the "normal conversation" mode is detected by converter 51. At $t6$ in the waveform of FIG. 8, a tip party signal of +38 volts on line 7'-2 will be attenuated to approximately +19 volts on line 7'-3 and to approximately +1.45 volts on line 31. The +1.45 volts is greater than the thresholds on lines 563 through 565 but less than the thresholds on lines 566 and 567. Under these conditions the "normal score" condition is detected and provides the appropriate outputs as indicated in CHART I.

If the ring party is the calling party when the tip party line 7'-3 is addressed a +22 volts on line 7'-2 is reduced on line 31 to +0.69 volts. The +0.69 volts is less than the threshold on line 565 and hence will not generate a "normal score" condition as the output from converter 51. Accordingly, when the addressing circuitry of FIG. 2 addresses a tip party line, such as line 7'-3, but the calling party on line 7'-2 is a ring party, the converter of FIG. 7 will not output a "normal score" signal.

If a called party disconnect occurs when a tip party is addressed, the +8 volts on line 7'-2 is reduced to +4 volts on line 7'-3 and is further reduced to +0.3 volts on line 31. Under these conditions, the signal on line 31 is greater than the thresholds on lines 563 and 564 but less than the thresholds on lines 565, 566 and 567. Therefore, the appropriate "normal called party disconnect" condition is provided by the converter of FIG. 7.

While the invention has been particularly shown and described with reference to preferred embodiments thereof it will be understood by those skilled in the art that various changes in form and details may be made therein without departing from the spirit and the scope of the invention.

What is claimed is:

1. A message metering apparatus for metering subscriber usage of a telephone system, said telephone system including a plurality of subscribers having associated subscribed lines, including a plurality of trunk circuits having associated trunk lines, and including switching circuits for connecting the subscriber lines to the trunk lines, the improvement comprising, multi-level signal generator means connected to said trunk circuits for generating multi-level subscriber signals associated with each calling subscriber where the multi-level signals represent information about subscriber usage of the telephone system, and metering means connected to the subscriber lines for periodically addressing a subscriber line for each subscriber and for sensing the associated multi-level signals for each calling subscriber for metering subscriber usage of the telephone system.

2. The apparatus of claim 1 wherein at least some of the subscribers are two-party subscribers connected by subscriber lines in a two-party connection and wherein said multi-level signal generator means further includes, first means for generating a first level of said multi-level signals for identifying a first one of said two-party subscribers as the calling party and second means for generating a second level of said multi-level signals for identifying a second one of said two-party subscribers as the calling subscriber.

3. The apparatus of claim 1 wherein said switching circuits are operative in connection with a calling party call to a called party to connect a sleeve line associated with the subscriber lines of the calling party to a sleeve line associated with a trunk line to the called party, wherein said trunk circuits are operative to provide an answer signal in response to a called party answer, and wherein said multi-level signal generator means further includes, busy detector means for sensing the connection of the sleeve lines by the switching circuits and responsively removing an inhibit signal, generating means responsive to the answer supervision signal after the inhibit signal is removed for generating a multi-level signal having levels indicating a called party answer, conversation, a called disconnect, and a trunk disconnect.

4. The apparatus of claim 3 wherein at least some of the subscribers are two party subscribers connected by subscriber lines in a two-party connection, wherein the trunk circuits are operative to provide a party signal indicating which party is the calling party in a two-party connection, and wherein said multi-level signal generator further includes, a party store for indicating which subscriber is the calling party, and means within said generating means further responsive to said party store for generating a unique signal level for each subscriber in a two-party connection for identifying the calling subscriber.

5. The apparatus of claim 1 wherein said metering means includes an analog-to-digital converter for detecting said multi-level signals and for responsively forming an encoded digital signal representing said multi-level signal.

6. The apparatus of claim 1 wherein said switching circuits are operative to connect a sleeve line associated with the subscriber lines to a sleeve line associated with the trunk lines in connection with a calling party call to a called party, wherein said trunk circuits are operative to provide an answer signal in response to a called party answer, and wherein said multi-level signal generator means further includes, busy detector means for sensing the sleeve line connection by the switching circuits and responsively removing an inhibit signal, generating means responsive to the answer signal after the inhibit signal is removed for generating a multi-level signal having levels indicating a called party answer, conversation, a called party disconnect, and a calling party disconnect, and wherein said metering means includes an analog-to-digital converter for detecting multi-level signals and for responsively forming encoded digital signals representing subscriber usage.

7. The apparatus of claim 6 wherein said analog-to-digital converter includes a plurality of threshold circuits each connected to receive the multi-level signal for providing a binary output which represents the presence of a unique level of the multi-level signal and includes digital encoding means responsive to the binary outputs for providing an encoded binary representation of the multi-level signal.

8. The apparatus of claim 6 wherein said metering means further includes attenuator means connected to each two-level sleeve line associated with multi-party subscribers, said attenuating means operative, for signals associated with parties other than calling parties, to shift the multi-level signal to a non-detected range while allowing the analog-to-digital converter to detect signals associated with the calling party.

9. The apparatus of claim 1 where at least some of said subscribers are two-party subscribers connected by subscriber lines in a two-party connection and wherein said multi-level signal generator means further includes, busy detector means for sensing the not busy condition of the multi-level sleeve line and for removing an inhibit signal when the sleeve line becomes connected, a party store responsive to said trunk circuits for storing the identity of which party is the calling party in a two-party connection after the inhibit signal has been removed, answer supervision detection means for detecting a called party answer, control logic means, operative after the inhibit signal has been removed, and responsive to signals from said party store means, said answer supervision means and said busy detector means for providing logical outputs representing usage of the telephone system by the calling party, and digital-to-analog converter means responsive to said control logic means for responsively generating the multi-level signal representing the calling party usage of the telephone system.

10. The apparatus of claim 1 wherein at least some of said subscriber lines are connected with a two-party connection, and wherein said multi-level signal generator means further includes, a party store responsive to said trunk circuits for storing the identity of which party is the calling party in a two-party connection, answer supervision detection means for detecting a called party answer, zone pulse circuitry means for detecting and storing the number of zones between the called party and the calling party, busy detector means for sensing the not busy condition on the multi-level signal line, control logic means responsive to signals from the said party store means, said answer supervision detection means, said zone pulse circuitry means, and said busy detector means for providing logical outputs representing the usage of the system by the calling party, and digital-to-analog converter means responsive to said control logic means for responsively generating the multi-level signal representing the calling party usage of the telephone system.

11. The apparatus of claim 9 wherein said digital-to-analog converter further includes, ratio circuit means responsive to a command level from said control logic means and the multi-level sleeve line for providing an output signal when the level on said sleeve line does not equal the command level, a current detector means for sensing the output from said ratio circuit means to provide a digital representation indicating when the output level does not equal the command level, a resonant circuit means for providing the multi-level signal sleeve line output and for providing a not busy output line, a free-running generator input to said resonant circuit means for providing energy to said resonant circuit means, a skip-pulse generator means responsive to said current detector means for causing inputs to said resonant circuit means from said free-running generator to be skipped in order to cause said multi-level signal to equal the command signal.

12. The apparatus of claim 4 further including detection means for detecting the multi-level signals for each subscriber in a two-party connection, said detection means including attenuator means for shifting the level of said multi-level signals and including an analog-to-digital converter means having a plurality of threshold detectors responsive to the signals for each subscriber as attenuated for discriminating between the subscribers in a two-party connection.

13. The apparatus of claim 1 further including a zone pulse generator connected to said switching circuits for generating zone pulses identifying the number of zones in a call from a calling subscriber to a called subscriber and wherein said multi-level signal generator means further includes, busy detector means for sensing a not busy condition on the multi-level sleeve line and for removing an inhibit signal when the sleeve line becomes connected, answer supervision detection means for detecting a called party answer, zone pulse circuitry means for detecting and storing the number of zone pulses generated by said zone pulse generator, control logic means, operative after the inhibit signal has been removed, and responsive to signals from said answer supervision means, from said busy detector means and from said zone pulse generator for providing logical outputs representing usage of the telephone system by the calling party, said logical outputs including a count equal to the number of zone pulses stored by said zone pulse circuitry means, and digital-to-analog converter means responsive to said control means for responsively generating the multi-level signal representing the calling party usage of the telephone system.

14. The apparatus of claim 13 wherein said zone pulse circuitry means further includes, a zone store connected to receive the zone pulses from said zone pulse generator, first and second counters for counting and storing zone pulses, said counters serially counting up or down in response to a signal from said control logic means, said counters operative to parallel load a strapped zone count in response to a signal from said control logic, and said counters providing parallel outputs, and first and second counter control means for controlling the counting up of said counters in response to counts from said zone store and the counting down of said counters in response to command pulses from said control logic.

15. A message metering apparatus for metering subscriber usage of a telephone system, said telephone system including a plurality of subscribers having associated tip, ring and sleeve subscriber lines, including a plurality of trunk circuits having associated tip, ring and sleeve trunk lines and including switching circuits for connecting the subscriber lines to the trunk lines, said switching circuits including means operative in connection with a calling party call to a called party to connect the trunk sleeve line associated with the called subscriber to the subscriber sleeve line associated with the calling subscriber, said switching circuits including means operative to provide an answer signal in response to a called party answer, the improvement comprising, multi-level signal generator means connected to said trunk circuits for generating multi-level subscriber signals on the sleeve line associated with each calling subscriber where the multi-level signals represent information about calling subscriber usage of a telephone system, said multi-level signal generator means further including, busy detector means for sensing the connection of the trunk and subscriber sleeve lines and for responsively removing an inhibit signal output from said busy detector means, answer supervision detection means for detecting a called party answer and responsively providing an answer signal, control logic means, including means responsive to the removal of the inhibit signal and including means responsive to said answer supervision means and said busy detector means for providing logical outputs representing usage of the telephone system by the calling party, and digital-to-analog converter means responsive to said control logic means for responsively generating the multi-level signal, metering means connected to the subscriber sleeve lines for periodically addressing each subscriber and for sensing the presence of associated multistate signals for each calling subscriber said metering means further including analog-to-digital converter means for detecting multi-level signals and responsively forming encoded digital signals representing subscriber usage.

16. A message metering apparatus for metering subscriber usage of a telephone system, said telephone system including a plurality of two-party subscribers having associated tip, ring and sleeve subscriber lines connected in common in a two-party connection, including a plurality of trunk circuits having tip, ring and sleeve trunk lines, and including switching circuits for connecting the subscriber lines to the trunk lines, said switching circuits including means operative in connection with a calling party call to a called party to connect the trunk sleeve line associated with the called subscriber to the subscriber sleeve line associated with the calling subscriber, said switching circuits including means operative to provide an answer signal in response to a called party answer, said switching circuits including means for identifying which party is the calling party in a two-party connection, the improvement comprising, multi-level signal generator means connected to said trunk circuits for generating multi-level subscriber signals on the sleeve line associated with each calling subscriber where the multi-level signals represent information about the calling subscriber usage of a telephone system, said multi-level signal generator means further including, busy detector means for sensing the connection of the trunk and subscriber sleeve lines and for responsively removing an inhibit signal output from said busy detector means, a party store responsive to said party signal for storing the identity of which party is the calling party after the inhibit signal has been removed, answer supervision detection means for detecting a called party answer and responsively providing an answer signal, control logic means, including means responsive to the removal of the inhibit signal and including means responsive to said busy detector means for providing logical outputs representing usage of the telephone system by the calling party, and digital-to-analog converter means responsive to said control logic means for responsively generating the multi-level signal, metering means connected to the subscriber sleeve lines for periodically addressing each subscriber and for sensing the presence of associated multi-level signals for each calling subscriber, said metering means further including detection means for detecting the multi-level signals for each subscriber in a two-party connection, said detection means including attenuator means for shifting the level of said multi-level signals and including an analog-to-digital converter means having a plurality of threshold detectors responsive to the signals for each subscriber as attenuated for discriminating between the subscribers in a two-party connection.

17. A message metering apparatus for metering subscriber usage of a telephone system, said telephone system including a plurality of two-party subscribers having associated tip, ring and sleeve subscriber lines connected in common in a two-party connection, including a plurality of trunk circuits having tip, ring and sleeve trunk lines and including switching circuits for connecting the subscriber lines to the trunk lines where said switching circuits include means operative in connection with a calling subscriber call to a called subscriber to connect the trunk sleeve line which becomes associated with the called subscriber to the subscriber sleeve line associated with the calling subscriber, said switching circuits including means operative to provide an answer signal in response to a called party answer, said switching circuits including means for identifying by a party signal which party is the calling subscriber in a two-party connection, said switching circuits including means for identifying the number of zones between a calling party and a called party, the improvement comprising, zone pulse generator means connected to the switching circuits for generating a number of zone pulses equal to the number of zones between a calling and called party, multi-level signal generator means connected to said trunk circuits for generating multi-level subscriber signals on the sleeve line associated with each calling subscriber where the multi-level signals represent information about the calling subscriber usage of the telephone system, said multi-level signal generator means further including, busy detector means for sensing the connection of the trunk and subscriber sleeve lines by said switching circuits and for responsively causing said busy detector means to generate a non-inhibit output signal, a party store responsive to said party signal and to said non-inhibit signal for storing the identity of which party is the calling party, zone pulse circuitry means for detecting and storing the number of zone pulses generated by said zone pulse generator means, answer supervision detection means for detecting a called party answer and responsively providing an answer signal, control logic means, responsive to said non-inhibit signal, said answer supervision means, said busy detector means and said zone pulse circuitry means for providing logical outputs respresenting usage of the telephone system by the calling party, and digital-to-analog converter means responsive to said control logic means for responsively generating the multi-level signal, metering means connected to the subscriber sleeve lines for periodically addressing each subscriber and for sensing the presence of associated multi-level signals for each calling subscriber said metering means further including detection means for detecting the multi-level signals for each subscriber in a two-party connection, said detection means including attenuator means for shifting the level of said multi-level signals and including an analog-to-digital converter means having a plurality of threshold detectors responsive to the signals for each subscriber as attenuated for discriminating between the subscribers in a two-party connection.

18. A message metering apparatus for metering subscriber usage of a telephone system, said telephone system including a plurality of two-party subscribers having associated tip, ring and sleeve subscriber lines connected in common in a multi-party connection, including a plurality of trunk circuits having tip, ring and sleeve trunk lines and including switching circuits for connecting the subscriber lines to the trunk lines where said switching circuits include means operative in connection with a calling subscriber call to a called subscriber to connect the trunk sleeve line which becomes associated with the called subscriber to the subscriber sleeve line associated with the calling subscriber, said switching circuits including means operative to provide an answer signal in response to a called party answer, said switching circuits including means for identifying by a party signal which party is the calling subscriber in a two-party connection, said switching circuits including means for identifying the number of zones between calling party and a called party, the improvement comprising, zone pulse generator means connected to switching circuits for generating a number of zone pulses equal to the number of zones between a calling and called party, the improvement comprising, multi-level signal generator means connected to said trunk circuits for generating multi-level subscriber signals on the sleeve line associated with each calling subscriber where the multi-level signals represent information about the calling subscriber usage of the telephone system, said multi-level signal generator means further including, busy detector means for sensing the connection of the trunk and subscriber sleeve lines by said switching circuits and for responsively causing said busy detector means to generate a non-inhibit output signal, a party store responsive to said party signal and to said non-inhibit signal for storing the identity of which party is the calling party, zone pulse circuitry means for detecting and storing the number of zone pulses generated by said zone pulse generator means, answer supervision detection means for detecting a called party answer and responsively providing an answer signal, control logic means, responsive to said non-inhibit signal, said answer supervision means, said busy detector means and said zone pulse circuitry means for providing logical outputs representing usage of the telephone system by the calling party, and digital-to-analog converter means responsive to said control logic means for responsively generating the multi-level signal, wherein said digital-to-analog converter further includes, ratio circuit means responsive to a command level from said control logic means and the multi-level sleeve line for providing an output signal when the level on said sleeve line does not equal the command level, a current detector means for sensing the output from said ratio circuit means to provide a digital representation indicating when the output level does not equal the command level, a resonant circuit means for providing the multi-level signal sleeve line output and for providing a not busy output line, a free-running generator input to said resonant circuit means for providing energy to said resonant circuit means, a skip-pulse generator means responsive to said current detector means for causing inputs to said resonant circuit means from said free-running generator to be skipped in order to cause said multi-level signal to equal the command signal, metering means connected to the subscriber sleeve lines for periodically addressing each subscriber and for sensing the presence of associated multi-level signals for each calling subscriber said metering means further including detection means for detecting the multi-level signals for each subscriber in a two-party connection, said detection means including attenuator means for shifting the level of said multi-level signals and including an analog-to-digital converter means having a plurality of threshold detectors responsive to the signals for each subscriber as attenuated for discriminating between the subscribers in a two-party connection.

19. In a message metering apparatus for metering subscriber usage of a telephone system where said telephone system includes a plurality of subscribers having associated subscriber lines, includes a plurality of subscribers having associated subscriber lines, includes a plurality of trunk circuits having associated trunk lines, and includes switching circuits for connecting the subscriber lines to the trunk lines, the improved method comprising the steps of, generating multi-level subscriber signals on subscriber lines associated with each calling subscriber where the multi-level signals represent information about subscriber usage of the telephone system, periodically addressing a subscriber line for each subscriber for sensing a multi-level signal for each calling subscriber, and converting the multi-level signal to a binary encoded digital signal which represents the calling subscriber usage of the telephone system.

20. The method of claim 19 wherein said apparatus includes at least some two-party subscribers connected by subscriber lines in a two-party connection wherein said method further includes the steps of, generating a unique level of said multi-level subscriber signals for each subscriber in a two-party connection, forming an attenuated multi-level signal for each two-party connection so as to form a unique multi-level signal for each subscriber, and converting the unique multi-level signal for each subscriber, using a plurality of threshold detectors which discriminate against non-addressed subscribers, to a binary encoded digital signal which represents the calling subscriber usage of the telephone system.

* * * * *